US009183237B2

(12) United States Patent
Banville et al.

(10) Patent No.: US 9,183,237 B2
(45) Date of Patent: Nov. 10, 2015

(54) METHODS AND APPARATUS RELATED TO GATE BOUNDARIES WITHIN A DATA SPACE

(71) Applicant: Nodality, Inc., San Francisco, CA (US)

(72) Inventors: Steven C. Banville, Sunnyvale, CA (US); Santosh K. Putta, Foster City, CA (US); David C. Spellmeyer, Oakland, CA (US); Nikil Wale, Foster City, CA (US); Erik Evensen, Foster City, CA (US); Norman Purvis, Redwood City, CA (US); Greg Friedland, San Francisco, CA (US)

( * ) Notice: Subject to any disclaimer, the term of this patent is extended or adjusted under 35 U.S.C. 154(b) by 500 days.

(21) Appl. No.: 13/685,110

(22) Filed: Nov. 26, 2012

(65) Prior Publication Data
US 2013/0173618 A1 Jul. 4, 2013

Related U.S. Application Data

(63) Continuation-in-part of application No. 13/399,483, filed on Feb. 17, 2012, now abandoned, which is a continuation of application No. 12/501,295, filed on Jul. 10, 2009, now abandoned.

(60) Provisional application No. 61/079,579, filed on Jul. 10, 2008.

(51) Int. Cl.
*G06F 19/00* (2011.01)
*G06F 17/30* (2006.01)
(Continued)

(52) U.S. Cl.
CPC ...... *G06F 17/30312* (2013.01); *G06K 9/00127* (2013.01); *G06K 9/6253* (2013.01)

(58) Field of Classification Search
CPC .......... G01N 15/1012; G01N 15/1456; G01N 2015/1006
USPC ......................................... 702/179, 182–185
See application file for complete search history.

(56) References Cited

U.S. PATENT DOCUMENTS 4,700,294 A   10/1987   Haynes
4,845,653 A    7/1989   Conrad et al.
(Continued)

FOREIGN PATENT DOCUMENTS

WO   WO 2007/117423 A2   10/2007

OTHER PUBLICATIONS

Krutzik et al., "Coordinate Analysis of Murine Immune Cell Surface Markers and Intracellular Phosphoproteins by Flow Cytometry," The Journal of Immunology, The American Association of Immunologists, Inc., Copyright © 2005, pp. 2357-2365.
(Continued)

*Primary Examiner* — Edward Raymond

(57) ABSTRACT

In one embodiment, one or more processor-readable media storing code representing instructions that when executed by one or more processors cause the one or more processors to receive a set of parameter values defining a boundary within a data space associated with a dataset. The dataset can represent signaling related to a test substance. A first metric can be defined based on a first portion of the dataset associated with a first region defined by the boundary. A second metric can be defined based on a second portion of the dataset associated with a second region defined by the boundary after the boundary is modified. The second region can be different than the first region.

20 Claims, 21 Drawing Sheets

(51) Int. Cl.
*G06K 9/00* (2006.01)
*G06K 9/62* (2006.01)

(56) References Cited

U.S. PATENT DOCUMENTS

| | | | |
|---|---|---|---|
| 4,987,539 | A | 1/1991 | Moore et al. |
| 5,023,080 | A | 6/1991 | Gupta |
| 5,079,005 | A | 1/1992 | Gupta |
| 5,122,453 | A | 6/1992 | Martin et al. |
| 5,224,058 | A | 6/1993 | Mickaels et al. |
| 5,314,825 | A | 5/1994 | Weyrauch et al. |
| 5,348,705 | A | 9/1994 | Koreyasu et al. |
| 5,358,691 | A | 10/1994 | Clark et al. |
| 5,422,277 | A | 6/1995 | Connelly et al. |
| 5,451,505 | A | 9/1995 | Dollinger |
| 5,597,688 | A | 1/1997 | Connelly et al. |
| 5,627,040 | A | 5/1997 | Bierre et al. |
| 5,739,000 | A | 4/1998 | Bierre et al. |
| 5,812,419 | A | 9/1998 | Chupp et al. |
| 6,004,572 | A | 12/1999 | Harvan et al. |
| 6,014,904 | A | 1/2000 | Lock |
| 6,121,048 | A | 9/2000 | Zaffaroni et al. |
| 6,178,382 | B1 | 1/2001 | Roederer et al. |
| 6,387,328 | B1 | 5/2002 | Berndtsson |
| 6,399,365 | B2 | 6/2002 | Besemer et al. |
| 6,520,618 | B2 | 2/2003 | Yoshida et al. |
| 6,830,936 | B2 | 12/2004 | Anderson et al. |
| 6,890,487 | B1 | 5/2005 | Sklar et al. |
| 6,944,338 | B2 | 9/2005 | Lock et al. |
| 6,947,953 | B2 | 9/2005 | Herzenberg et al. |
| 6,954,722 | B2 | 10/2005 | Parks et al. |
| 7,316,897 | B2 | 1/2008 | Bisconte de Saint Julien et al. |
| 7,321,843 | B2 | 1/2008 | Orfao De Matos Correia E Vale et al. |
| 7,326,577 | B2 | 2/2008 | Shults et al. |
| 7,381,535 | B2 | 6/2008 | Perez et al. |
| 7,393,656 | B2 | 7/2008 | Perez et al. |
| 7,555,492 | B2 | 6/2009 | Herzenberg et al. |
| 7,563,584 | B2 | 7/2009 | Perez et al. |
| 7,650,351 | B2 | 1/2010 | Herzenberg et al. |
| 7,695,924 | B2 | 4/2010 | Perez et al. |
| 7,695,926 | B2 | 4/2010 | Perez et al. |
| 7,734,557 | B2 | 6/2010 | Meehan et al. |
| 2002/0029235 | A1 | 3/2002 | Lock et al. |
| 2002/0049782 | A1 | 4/2002 | Herzenberg et al. |
| 2002/0079008 | A1 | 6/2002 | Chien et al. |
| 2002/0125139 | A1 | 9/2002 | Chow et al. |
| 2003/0078703 | A1 | 4/2003 | Potts et al. |
| 2004/0143423 | A1 | 7/2004 | Parks et al. |
| 2004/0220897 | A1 | 11/2004 | Bernhart et al. |
| 2005/0009078 | A1 | 1/2005 | Craford et al. |
| 2005/0044110 | A1 | 2/2005 | Herzenberg et al. |
| 2005/0273475 | A1 | 12/2005 | Herzenberg et al. |
| 2006/0015291 | A1* | 1/2006 | Parks et al. ............. 702/179 |
| 2006/0134599 | A1 | 6/2006 | Toner et al. |
| 2006/0141549 | A1 | 6/2006 | Mahajan et al. |
| 2006/0210435 | A1 | 9/2006 | Alavie et al. |
| 2006/0258019 | A1 | 11/2006 | Chow et al. |
| 2007/0009923 | A1 | 1/2007 | Nolan et al. |
| 2007/0078626 | A1 | 4/2007 | Orfao De Matos Correia E Vale et al. |
| 2007/0118297 | A1 | 5/2007 | Thayer |
| 2007/0157973 | A1 | 7/2007 | Chien et al. |
| 2007/0196869 | A1 | 8/2007 | Perez et al. |
| 2007/0299799 | A1 | 12/2007 | Meehan et al. |
| 2009/0204557 | A1 | 8/2009 | Zhang |
| 2009/0269800 | A1 | 10/2009 | Covey |
| 2009/0287421 | A1 | 11/2009 | Malachowski et al. |
| 2009/0327240 | A1 | 12/2009 | Meehan et al. |
| 2020/0014741 | | 1/2010 | Banville |
| 2010/0030719 | A1 | 2/2010 | Covey |
| 2010/0042351 | A1 | 2/2010 | Covey |
| 2010/0070459 | A1 | 3/2010 | Zigon et al. |
| 2010/0070502 | A1 | 3/2010 | Zigon |
| 2010/0070904 | A1 | 3/2010 | Zigon et al. |
| 2010/0161561 | A1 | 6/2010 | Moore et al. |
| 2010/0228491 | A1 | 9/2010 | Gutierrez et al. |

OTHER PUBLICATIONS

Krutzik et al., "Characterization of the Murine Immunological Signaling Network with Phosphospecific Flow Cytometry," Tthe Journal of Immunology, The American Association of Immunologists, Inc., Copyright © 2005, pp. 2366-2373.

Krutzik et al., "Analysis of protein phosphorylation and ceullular signaling events by flow cytometry: techniques and clinical applications," Clinical Immunology, 110 (2004) pp. 206-221.

Irish et al., "Single Cell Profiling of Protentiated Phospho-Protein Networks in Cancer Cells," Cell, vol. 118, pp. 217-228, Jul. 23, 2004, Copyright © 2004 by Cell Press.

Irish et al., "Mapping normal and cancer cell signalling networks: towards single-cell proteomics," Nature Reviews/Cancer, vol. 6, Feb. 2006, pp. 146-155, © 2006 Nature Publishing Group.

Irish et al., "Flt3 Y591 duplication and Bcl-2 overexpression are detected in acute myeloid leukemia cells with high levels of phosphorylatcd wild-type p53," From www.bloodjournal.org on Dec. 19, 2008, Blood, Mar. 15, 2007, vol. 109, No. 6, pp. 2588-2596.

Irimia et al., "Universal Microfluidic Gradient Generator," Analytical Chemistry, vol. 78, No. 10, May 15, 2006, pp. 3472-3477.

Chow et al., "Measurement of MAP Kinase Activation by Flow Cytometry Using Phospho-Specific Antibodies to MEK and ERK: Potential for Pharmacodynamic Monitoring of Signal Transduction Inhibitors," Cytometry (Communication in Clinical Cytometry) 46:72-78 (2001).

Demirci et al., "Direct etch method for microfludic channel and nanoheight post-fabrication by picoliter droplets," Applied Physics Letters 88, 053117 Feb. 1, 2006.

International Search Report and Written Opinion from PCT/US2009/050307, mailed on Mar. 4, 2010, 16 pages.

Krutzik et al., "High-content single-cell drug screening with phosphospecific flow cytometry," Nature Chemical Biology, © 2007 Nature Publishing Group http://www.nature.com/naturechemicalbiology.com , pp. 1-11.

Krutzik et al., "Intracellular Phospho-protein Staining Techniques for Flow Cytometry: Monitoring Single Cell Signaling Events," Cytometry Part A 55A:61-70 (2003), pp. 61-70.

Perez et al., "Simultaneous measurement of multiple active kinase states using polychromatic flow cytometry," Nature Biotechnology, vol. 20, Feb. 2002, http://biotech.nature.com, pp. 155-162.

Schulz et al., "Single-Cell Phospho-Protein Analysis by Flow Cytometry," Current Protocols in Immunology 8.17.1-8.17.20, Aug. 2007, Published online Aug. 2007 in Wiley Intersciences (www.interscience.wiley.com).

Stelzer et al., "Use of Multiparameter Flow Cytometry and Immunophenotyping for the Diagnosis and Classification of Acute Myeloid Leukemia," Immunophenotyping, © 2000 Wiley-Liss, Inc., pp. 215-246.

Tanner et al., Multiplex bio-assay with inductively coupled plasma mass spectrometry: Towards a massively multivariate single-cell technology, Spectrochimica Acta Part B 62 (2007) pp. 188-195.

Aguilera et al., "Permeabilizing action of an antimicrobial lactoferricin-derived peptide on bacterial and artificial membranes," FEBS Letters 462 (1999) 273-277.

Büssing et al., "Expression of Mitochondrial Apo2.7 Molecules and Caspase-3 Activation in Human Lymphocytes Treated With the Ribosome-Inhibiting Mistletoe Lectins and the Cell Membrane Permeabilizing Viscotoxins," Cytometry 37:133-139 (1999).

Goncalves et al., "The Use of Permeabilized Cells to Assay Protein Phosphorylation and Catecholamine Release," Neurochemical Research, vol. 25, No. 6, 2000, pp. 885-894.

Seller et al., "Electroosmotic Pumping and Valveless Control of Fluid Flow within a Manifold of Capillaries on a Glass Chip," Anal. Chem. 1994, vol. 66, No. 20, Oct. 15, 1994, pp. 3485-3491.

Stewart et al., "Immunophenotyping," © 2000 by Wiley-Liss, Inc.

Pizzolo et al., "Detection of Membrane and Intracellular Antigens by Flow Cytometry Following Ortho PermeaFix™ Fixation," Leukemia, vol. 8, No. 4 Apr. 1994: pp. 672-676.

(56) References Cited

OTHER PUBLICATIONS

Francis et al., "Rapid Single-Step Method for Flow Cytometric Detection of Surface and Intracellular Antigens Using Whole Blood," Cytometry 25:58-70 (1996).

Metso et al., "Identification of intracellular markers in induced sputum and bronchoalveolar lavage samples in patients with respiratory disorders and healthy persons," Respiratory Medicine, vol. 96 (2002) 918-926.

Gait, "Oligonucleotide synthesis: a practical approach," Table of Contents, 7 pgs.

TruCulture® Blood Collection and Whole Blood Culture System (RUO), TruCulture—GW | Myriad RBM, pp. 1-3, http://www.rulesbasedmedicine.com/products-services/truculture/GW.

"Cytobank Invitrogen and ScienceXperts Launch Software to Demystify Multicolor Flow Cytometry." CytoGenie launched, http://www.isac-net.org/index.php?option=com_content&task=view&id=571&Itemid=45, 1 pg.

About Cytobank—Cytobank documentation, http://does.cytobank.org/wagn/About_Cytobank, 1 pg.

About Cytobank, Cytobank, http://www.cytobank.org/about/about.html, 1 pg.

Multicolor Flow Cytometry Demystified, © 2007 Invitrogen Corporation, http://www.invitrogen.com/etc/medialib/en/filelibrary/pdf/bioprobes.Par.0366.File.dat/BP53_03.pdf, 1 pg.

Lugli et al., "Subject Classification Obtained by Cluster Analysis and Principal Component Analysis Applied to Flow Cytometric Data", published online Mar. 12, 2007, International Society for Analytical Cytology, Cytology Part A 71A:334-344.

Whyatt et al., "The Douglas-Peucker Line Simplification Algorithm", 1988 Society of University Cartographers, Bulletin 22(1): 17-25.

Koontz et al., "A Nonparametric Valley-Seeking Technique for Cluster Analysis", Feb. 1972, IEEE Transactions on Computers, vol. C-21, No. 2, pp. 171-178.

Visvalingam et al., "The Douglas-Peucker Algorithm for Line Simplification: Re-evaluation through Visualization", Sep. 1990 Computer Graphics Forum, pp. 213-225.

Mansmann, S. et al., "Hierarchy-driven Viscual Exploration of Multidimensional data Cubes," Konstanzer Online-Publikations-System (KOPS) [online] retrieved from the Internet <URL: http://www.ub.uni-konstanz.de/kops/voltexte/2008/6878/.

Huyn, N., "Scientific OLAP for the Biotech Domain," Proceedings of the 27$^{th}$ VLDB Conference, Roma, Italy, 2001.

Saez-Rodriguez, J. et al., "Flexible informatics for linking experimental data to mathematical models via *DataRail*." Bioinformatics, vol. 24, No. 6, 2008, pp. 840-847.

Tanner, S. et al., "Multiplex bio-assay with inductively coupled plasma mass spectrometry: Towards a massively multivariate single-cell technology," Spectrochimica Acta Part B, vol. 62 (2007), pp. 188-195.

"Fluorophore selection guide for flow cytometry" invitrogen guide © 2007; 44 pages.

Office Action mailed Oct. 20, 2011 for U.S. Appl. No. 12/501,295, filed Jul. 10, 2009.

Office Action mailed Oct. 24, 2011 for U.S. Appl. No. 12/501,274, filed Jul. 10, 2009.

Examination Report dated Jan. 31, 2012 for Application No. GB1102311.6.

Office Action mailed Jun. 25, 2012 for U.S. Appl. No. 13/399,483, filed Feb. 17, 2012.

\* cited by examiner

| Channel | Parameter | Alias | Transform |
|---|---|---|---|
| FSC-A | FSC-A | FSC-A | linear |
| SSC-A | SSC-A | SSC-A | log |
| Blue_E-A | p-Stat1_Y70: | p-Stat1 | log |
| Blue_D-A | CD27 | CD27 | log |
| Blue_B-A | CD45RA-Bioti | CD45RA | log |
| Blue_A-A | CD20+CD4 | CD20+CD4 | log |
| Violet_B-A | CD3 | CD3 | log |
| Violet_A-A | CD14 | CD14 | log |
| Red_C-A | p-Stat3_Y705 | p-Stat3 | log |
| Red_A-A | Cleaved PARP | cPARP | log |

| Population Name | Logical Expression | Color | Count |
|---|---|---|---|
| Lymphocytes | ~R2&R1 | ■ − | 11475 |
| Monocytes | R2&R1 | ■ − | 5799 |
| cPARP Neg Lymphs | ~R2&R1&R4 | ■ − | 10816 |
| cPARP Neg Monos | R2&R1&R3 | □ − | 4315 |
| Intact Cells | R1 | ■ − | 17274 |
| CD4+ T Cells | ~R2&R1&R4&R5&R8 | ▒ − | 4337 |
| CD4+ T Cells | ~R2&R1&R4&R5&(~R8) | ▓ − | 2795 |
| B Cells | ~R2&R1&R4&(~R5)&R8 | ▓ − | 1454 |
| T Cells | ~R2&R1&R4&R5 | ▒ + | 7132 |

| Region | Parent population | Parameters | Flags |
|---|---|---|---|
| R1 | Ungated | SSC-A, FSC-A | |
| R2 | Ungated | CD14 | Cutpoint range violation: Single sharp peak |
| R3 | Monocytes | Cleaved PARP_D214_ | |
| R4 | Lymphocytes | Cleaved PARP_D214_ | |
| R5 | cPARP Neg Lymphs | CD3 | Cutpoint range violation: Single sharp peak |
| R6 | cPARP Neg Lymphs | CD45RA-Biotin | Cutpoint range violation |
| R7 | cPARP Neg Lymphs | CD27 | |
| R8 | cPARP Neg Lymphs | CD20+CD4 | |

FIG. 18 (Cont.)

| Region Name | Marker Name | Input Population Name | Region Location (high or low) | Expected Range of intensity within which the gate should fall (optional,ex.500-1000) | Bias | other information |
|---|---|---|---|---|---|---|
| R2 | CD14 | Ungated | high | 950-1050 | low | |
| R5 | CD3 | cPARP Neg Lymphs | high | 950-1050 | none | |
| R6 | CD45RA-Biotin | cPARP Neg Lymphs | high | 2000-4000 | none | |
| R7 | CD27 | cPARP Neg Lymphs | high | 1900-2100 | none | |
| R8 | CD20+CD4 | cPARP Neg Lymphs | high | 1000-2000 | none | |

| CD3+<br>CD4+ | CD3+<br>CD4+ | CD3+<br>CD4+ | CD3+<br>CD4+ | CD3+<br>CD4- | CD3+<br>CD4- | CD3+<br>CD4- | CD3+<br>CD4- | CD20+<br>CD2 | CD20+<br>CD27+ |
|---|---|---|---|---|---|---|---|---|---|
| R10 | R11 | R12 | R13 | R14 | R15 | R16 | R17 | R18 | R19 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 0 | 0 | 0 | 0 | 0 | 0 | 0 | 0 | 0 | 0 |
| 1 | 0 | 0 | 0 | 0 | 0 | 0 | 0 | 0 | 0 |
| 0 | 1 | 1 | 0 | 0 | 0 | 0 | 0 | 0 | 0 |
| 0 | 0 | 0 | 1 | 0 | 0 | 0 | 0 | 0 | 0 |
| 0 | 0 | 0 | 0 | 1 | 0 | 0 | 0 | 0 | 0 |
| 0 | 0 | 0 | 0 | 0 | 1 | 0 | 0 | 0 | 0 |
| 0 | 0 | 0 | 0 | 0 | 0 | 1 | 0 | 0 | 0 |
| 0 | 0 | 0 | 0 | 0 | 0 | 0 | 1 | 0 | 1 |
| 0 | 0 | 0 | 0 | 0 | 0 | 0 | 0 | 1 | 0 |
| 0 | 0 | 0 | 0 | 0 | 0 | 0 | 0 | 0 | 0 |

METHODS AND APPARATUS RELATED TO GATE BOUNDARIES WITHIN A DATA SPACE

RELATED APPLICATIONS

This application is a continuation-in-part of U.S. patent application Ser. No. 13/399,483, filed Feb. 17, 2012, entitled "Methods and Apparatus Related To Gate Boundaries Within a Data Space," which is a continuation of U.S. patent application Ser. No. 12/501,295, filed Jul. 10, 2009, entitled "Methods and Apparatus Related To Gate Boundaries Within a Data Space," which is a nonprovisional of U.S. Provisional Patent Application No. 61/079,579, filed Jul. 10, 2008, entitled "Gating Sensitivity Data Analysis," each of which is incorporated herein by reference in its entirety.

BACKGROUND

Embodiments relate generally to methods and apparatus for processing gate boundaries used to separate portions of datasets.

Data from a test device can be analyzed to, for example, classify one or more subpopulations of datapoints (e.g., datapoint clusters) from the data for further analysis. In some instances, geometric shapes (e.g., a polygon) can be used to define a gate boundary (can also be referred to as a gate or as a boundary) that separates the subpopulations of datapoints in a desirable fashion. The gate boundary can be manually defined and applied to the data by a user via a program such as FlowJo (TreeStar Inc., Ashland, Oreg.). In some instances, gate boundaries may not be defined in a desirable fashion (e.g., an effective fashion) based on this manual process because datapoints that fall into overlapping datapoint clusters and/or high density regions may not be readily handled (e.g., distinguished, analyzed) by a user. This can result in, for example, misclassification of datapoints and/or inaccurate statistical calculations related to the dataset. In addition, the manual definition and/or application of a gate boundary within a dataset can be relatively slow using known techniques and/or the quality of the gate boundary may not be measured in a desirable fashion. Thus, a need exists for methods and apparatus to address the shortfalls of present technology and to provide other new and innovative features.

SUMMARY

In one embodiment, one or more processor-readable media storing code representing instructions that when executed by one or more processors cause the one or more processors to receive a set of parameter values defining a boundary within a data space associated with a dataset. The dataset can represent signaling related to a test substance. A first metric can be defined based on a first portion of the dataset associated with a first region defined by the boundary. A second metric can be defined based on a second portion of the dataset associated with a second region defined by the boundary after the boundary is modified. The second region can be different than the first region.

BRIEF DESCRIPTION OF THE DRAWINGS

FIG. 19 illustrates an example of researcher specified region definitions used in an automated gating process, according to an embodiment.

DETAILED DESCRIPTION

Figure 1:
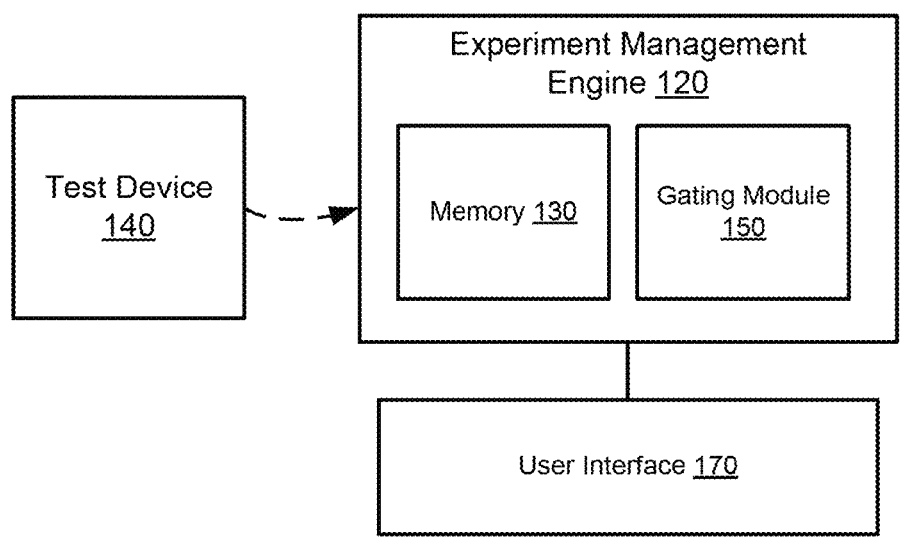
FIG. 1 is a schematic diagram that illustrates an experiment management engine that includes a gating module, according to an embodiment.

A gating module within an experiment management engine can be used to define one or more gate boundaries (e.g., a set of gate boundaries) within one or more data spaces associated with one or more datasets. The gate boundaries can be used to separate subpopulations of datapoints included in the datasets. In other words, a portion of the dataset (e.g., a datapoint of the dataset) can be separated from another portion of the dataset based on the gate boundary. In some embodiments, the gate boundary can be referred to as a gate or as a boundary.

In some embodiments, the gating module can be configured to define one or more metrics based on one or more perturbations (e.g., hundreds of perturbations) of one or more portions of a gate boundary (e.g., a vertex of a gate boundary) within a data space (e.g., a multi-dimensional data space) associated with at least a portion of a dataset (e.g., a multi-parametric dataset). A perturbation of the gate boundary can be a movement (e.g., a random movement, a specified movement) of the gate boundary from a first shape (e.g., an initial shape) to a second shape (e.g., a perturbed shape) within the data space. In some embodiments, a data space can be mathematically defined (and not visually defined).

In some embodiments, a gate boundary (and/or perturbations thereof) can be defined based on one or more limits. For example, a gate boundary can be perturbed within a region defined by multiple limits. In some embodiments, a limit can define or can be an indicator of, for example, a spread (e.g., a standard deviation) within which random perturbations can be defined. In some embodiments, the limits can be referred to as a boundary. In some embodiments, processing at the gating module can be performed, for example, based on one or more conditions (e.g., threshold values within a condition) and/or based on one or more user preferences (e.g., a customizable user preference). In some embodiments, one or more metrics calculated based on a shape (or shapes) of a gate boundary can be used to determine, for example, a quality of the gate boundary.

The following publications are hereby incorporated by reference in this patent application in their entireties:

Haskell et al., Cancer Treatment, 5$^{th}$ Ed., W.B. Saunders and Co., 2001;
Alberts et al., The Cell, 4th Ed., Garland Science, 2002;
Vogelstein and Kinzler, The Genetic Basis of Human Cancer, 2d Ed., McGraw Hill, 2002;
Michael, Biochemical Pathways, John Wiley and Sons, 1999;
Weinberg, The Biology of Cancer, 2007; Immunobiology, Janeway et al. 7th Ed.;
Garland, Leroith and Bondy, Growth Factors and Cytokines in Health and Disease, A Multi Volume Treatise, Volumes 1A and IB, Growth Factors, 1996;
Shapiro, Howard M., Practical Flow Cytometry, 4th Ed., John Wiley & Sons, Inc., 2003;
H. Rashidi and K. Buehler, Bioinformatics Basics: Applications in Biological Science and Medicine (CRC Press, London, 2000);
Bioinformatics: A Practical Guide to the Analysis of Genes and Proteins (B. F. Ouelette and A. D. Baxevanis, eds., Wiley & Sons, Inc.; 2d ed., 2001);
High-content single-cell drug screening with phosphospecific flow cytometry, Krutzik et al., Nature Chemical Biology, 23 Dec. 2007;
Krutzik et al., High-content single-cell drug screening with phosphospecific flow cytometry, Nat Chem Biol. 2008 February, 4(2):132-42;
Irish et al., Flt3 Y591 duplication and Bcl-2 over expression are detected in acute myeloid leukemia cells with high levels of phosphorylated wild-type p53, Neoplasia, 2007;
Irish et al. Mapping normal and cancer cell signaling networks: towards single-cell proteomics, Nature, Vol. 6 146-155, 2006;
Irish et al., Single cell profiling of potentiated phospho-protein networks in cancer cells, Cell, Vol. 118, 1-20 Jul. 23, 2004;
Schulz, K. R., et al., Single-cell phospho-protein analysis by flow cytometry, Curr Protoc Immunol, 2007, 78:8 8.17.1-20;
Krutzik, P. O., et al., Coordinate analysis of murine immune cell surface markers and intracellular phosphoproteins by flow cytometry, J. Immunol. 2005 Aug. 15, 175(4):2357-65;
Krutzik, P. O., et al., Characterization of the murine immunological signaling network with phosphospecific flow cytometry, J. Immunol. 2005 Aug. 15, 175(4):2366-73;
Shulz et al., Current Protocols in Immunology 2007, 78:8.17.1-20;
Stelzer et al., Use of Multiparameter Flow Cytometry and Immunophenotyping for the Diagnosis and Classification of Acute Myeloid Leukemia, Immunophenotyping, Wiley, 2000; and
Krutzik, P. O. and Nolan, G. P., Intracellular phospho-protein staining techniques for flow cytometry: monitoring single cell signaling events, Cytometry A. 2003 October, 55(2): 61-70.
Krutzik et al., Analysis of protein phosphorylation and cellular signaling events by flow cytometry: techniques and clinical applications, Clinical Immunology, Vol. 110, Issue 3, Pgs. 206-221, March 2004.

The following patents are hereby incorporated by reference in this patent application in their entireties: U.S. Pat. No. 7,381,535 and U.S. Pat. No. 7,393,656. The following patent applications are also hereby incorporated by reference in this patent application in their entireties: U.S. Ser. No. 10/193,462; U.S. Ser. No. 11/655,785; U.S. Ser. No. 11/655,789; U.S. Ser. No. 11/655,821; U.S. Ser. No. 11/338,957; U.S. Ser. No. 61/048,886; U.S. Ser. No. 61/048,920; U.S. Ser. No. 61/048,657; U.S. Ser. No. 61/079,766; U.S. Ser. No. 61/079,579; and U.S. Ser. No. 61/079,537.

Also, patents and applications that are incorporated by reference include U.S. Pat. Nos. 7,381,535, 7,393,656, 7,563,584, 7,695,924, 7,695,926, 7,939,278, 8,148,094, 8,187,885, 8,198,037, 8,206,939, 8,214,157, 8,227,202, 8,242,248; U.S. patent application Ser. Nos. 11/338,957, 11/655,789, 12/061,565, 12/125,759, 12/125,763, 12/229,476, 12/432,239, 12/432,720, 12/471,158, 12/501,274, 12/501,295, 12/538,643, 12/551,333, 12/581,536, 12/606,869, 12/617,438, 12/687,873, 12/688,851, 12/703,741, 12/713,165, 12/730,170, 12/778,847, 12/784,478, 12/877,998, 12/910,769, 13/082,306, 13/091,971, 13/094,731, 13/094,735, 13/094,737, 13/098,902, 13/098,923, 13/098,932, 13/098,939, 13/384,181; International Applications Nos. PCT/US2011/001565, PCT/US2011/065675, PCT/US2011/026117, PCT/US2011/029845, PCT/US2011/048332; and U.S. Provisional Application Ser. Nos. 60/304,434, 60/310,141, 60/646,757, 60/787,908, 60/957,160, 61/048,657, 61/048,886, 61/048,920, 61/055,362, 61/079,537, 61/079,551, 61/079,579, 61/079,766, 61/085,789, 61/087,555, 61/104,666, 61/106,462, 61/108,803, 61/113,823, 61/120,320, 61/144,68, 61/144,955, 61/146,276, 61/151,387, 61/153,627, 61/155,373, 61/156,754, 61/157,900, 61/162,598, 61/162,673, 61/170,348, 61/176,420, 61/177,935, 61/181,211, 61/182,518, 61/182,638, 61/186,619, 61/216,825, 61/218,718, 61/226,878, 61/236,281, 61/240,193, 61/240,613, 61/241,773, 61/245,000, 61/254,131, 61/263,281, 61/265,585, 61/265,743, 61/306,665, 61/306,872, 61/307,829, 61/317, 187, 61/327,347, 61/350,864, 61/353,155, 61/373,199, 61/374,613, 61/381,067, 61/382,793, 61/423,918, 61/436,534, 61/440,523, 61/469,812, 61/499,127, 61/515,660, 61/521,221, 61/542,910, 61/557,831, 61/558,343, 61/565,391, 61/565,929, 61/565,935, 61/591,122, 61/640,794, 61/658,092, 61/664,426, 61/693,429, and 61/713,260.

Some commercial reagents, protocols, software and instruments that can be used in at least some of the embodiments described herein can be accessed at the Becton Dickinson website at http://www.bdbiosciences.com/features/products/, the Beckman Coulter website at http://www.beckmancoulter.com/Defaultasp?bhfv=7, and Cell Signaling Technology's website at http://www.cellsignal.com. Experimental and process protocols and other information can be found at http://proteomics.stanford.edu and http://facs.stanford.edu.

As used in this application, the singular forms "a," "an," and "the" include plural references unless the context clearly dictates otherwise. For example, the term "a gate boundary" can include multiple gate boundaries. In some embodiments, an individual is not limited to a human being but may also be other organisms including, but not limited to mammals, plants, bacteria, or cells derived from any of the above. The embodiments set forth in this application may be implemented based on multiple different sets of dimensions (e.g., three dimensions, four dimensions), but are described with respect to a specific set of dimensions for illustrative purposes.

FIG. 1 is a schematic diagram that illustrates an experiment management engine 120 that includes a gating module 150, according to an embodiment. The gating module 150 of the experiment management engine 120 is configured to process at least a portion of a dataset produced, at least in part, at a test device 140. Specifically, the gating module 150 can be configured to define one or more gate boundaries (e.g., a set of gate boundaries) within one or more data spaces associated with one or more datasets. The data space(s) can be region(s) within which at least a portion of the dataset(s) (e.g., one or more datapoints from the dataset) can be included (or associated). For example, a data space can be a three-dimensional region within which the portion of a dataset can be plotted. In other words, datapoints can be plotted within the three-dimensional region of the data space based on data values included in the dataset. In some embodiments, a data space can have dimensions that cannot be plotted or plotted in a desirable fashion. In some embodiments, the data space can be infinitely large or can have finite limits that are defined based on datapoints included in the dataset. In some embodiments, the data space can be a vector space. In some embodiments, the data space can be defined based on any type of coordinate system such as a Cartesian coordinate system.

In some embodiments, a dataset that can be processed at the gating module 150 can include data (e.g., data values) associated with a test substance (e.g., a biological substance, a reagent, a cell, a sample). The dataset can be (or can include), for example, data (e.g., output test data) produced by a test device 140 and/or metadata (e.g., data associated with an experimental file) associated with data produced by a test device 140. For example, in some embodiments, the data can include signaling data representing one or more measurement values related to a test substance. The measurement values can include, for example, a temperature measurement value, a pressure measurement value, a concentration measurement value, a time value, and/or so forth. In some embodiments, the data from the dataset can represent a stimulus (e.g., an electrical pulse duration, a laser energy pulse power value, a reagent, a stain) and/or can represent a response of a test substance (e.g., a cell) to a stimulus. In some embodiments, one or more portions of a dataset can be defined based on an experiment file.

In some embodiments, a dataset can be defined by data related to one or more experiments. In some embodiments, data values included in the dataset can be associated with, for example, one or more wells, samples, combinations of samples, sample pools, and/or so forth. An experiment (e.g., a research experiment, a drug screening experiment, a diagnostic experiment) can include processing (e.g., testing, diagnostic testing) of a substance (e.g., a sample such as a biological sample and/or a reagent configured to stimulate the sample) at the test device 140 and/or preparation of the substance for processing at the test device 140. In some embodiments, any portion of a substance (e.g., a material) to be used during an experiment (e.g., during preparation, during testing at a test device, a quality control portion of an experiment) can be referred to as a test substance (or test material) or as a target substance (or target material). In some embodiments, the experiment management engine can be included in an experiment system. More details related to datasets and experimental files are described in co-pending U.S. patent application Ser. No. 12/501,274, filed on Jul. 10, 2009, entitled, "Methods and Apparatus Related to Management of Experiments"; U.S. Provisional Patent Application No. 61/079,551, filed on Jul. 10, 2008, entitled "Systems and Methods for Experimental Design, Layout and Inventory Management"; U.S. Provisional Patent Application No. 61/087,555, filed on Aug. 8, 2008, entitled "System and Method for Providing a Bioinformatics Database"; U.S. Provisional Patent Application No. 61/153,627, filed on Feb. 18, 2009, entitled "Methods and Apparatus Related to Management of Experiments"; and U.S. Provisional Patent Application No. 61/079,537, filed on Jul. 10, 2008, entitled "Method and System for Data Extraction and Visualization of Multi-Parametric Data"; all of which are incorporated herein by reference in their entireties.

One or more gate boundaries, which can be defined at the gating module 150, can be defined by one or more parameter values so that the gate boundary is included in a data space. In some embodiments, the gate boundary can be configured to separate a portion of the dataset (e.g., a datapoint of the dataset) from another portion of the dataset. In some embodiments, the gate boundary can circumscribe at least a portion of the dataset so that the portion of the dataset (e.g., a datapoint associated with a call) is included within (e.g., is inside of) the gate boundary and other portions of the dataset are outside of the gate boundary. In other words, the gate boundary can be used to separate (e.g., isolate, segregate) portions of the dataset. For example, in some embodiments, a gate boundary can define a two-dimensional perimeter around a set of datapoints associated with a dataset in a two-dimensional data space. In some embodiments, the gate boundary can include line segments (or curved lines) between vertices. For example, the gate boundary can be defined based on a set of parameter values that define the locations of each of the vertices and the line segments can be between the vertices. In some embodiments, at least a portion of a gate boundary can be disposed within a location (e.g., a point within a data space) also including a portion of a dataset. In some embodiments, the gate boundary can be referred to as a gate or as a boundary.

In some embodiments, the data space can be a multi-dimensional data space (e.g., a two-dimensional data space, a three-dimensional data space, a six-dimensional data space). Similarly, the dataset can be a multi-dimensional dataset (e.g., a four-dimensional dataset) and/or the gate boundary can be a multi-dimensional gate boundary (e.g., a five-dimensional gate boundary). In some embodiments, the gate boundary can include hyperplanes (e.g., hyperplanes between vertices). For example, a gate boundary can include or be defined, at least in part, by planes within a three-dimensional data space that includes datapoints associated with a three-dimensional dataset.

The gating module 150 can be configured to define one or more metrics based on perturbations of one or more portions of a gate boundary within a data space associated with at least a portion of a dataset. A perturbation of the gate boundary can be a movement of the gate boundary within the data space or a change in shape of the gate boundary. For example, a portion of a four-dimensional gate boundary can be moved from one location to another location within a four-dimensional data space. The movement of the gate boundary can be defined based on a change in a parameter value from a set of parameter values representing the four-dimensional gate boundary within the four-dimensional data space. In some embodiments, perturbations of a gate boundary can be referred to as jittering of the gate boundary. In some embodiments, the portions of the gate boundary perturbed can be in less (or more) dimensions than a data space within which the gate boundary is perturbed. For example, a portion of a two-dimensional gate boundary that defines a plane can be moved from one location to another location within a three-dimensional data space. In some embodiments, a perturbation of a gate boundary can be a change in a gate boundary that is mathematical and/or that cannot be plotted (e.g., displayed). In such instances, a set of parameter values defining the gate boundary can be changed when the gate boundary is perturbed.

In some embodiments, a perturbation of a gate boundary can be, for example, a change in a shape of a portion of the gate boundary. For example, a portion of a gate boundary can be changed from a flat plane into a convex shape, concave shape, or other shape. In some embodiments, a straight line between two vertices of a gate boundary can be changed to a curved line when the gate boundary is perturbed. In some embodiments, the straight line can be changed without a change in the positions of the vertices. In some embodiments, a perturbation of a gate boundary can be a change in an orientation of the gate boundary rather than a change in shape of the gate boundary. For example, a gate boundary can be rotated and/or translated when perturbed. In some embodiments, perturbations of a gate boundary can be defined along an axis.

In some embodiments, a gate boundary can have an open shape (non-closed shape). For example, a gate boundary can be defined by a quadrant of a data space defined within a Cartesian coordinate system. In such instances, the portions of the gate boundary relatively near the origin of the quadrant (and/or relatively near datapoints within the data space) can be perturbed while portions of the gate boundary relatively far from the origin of the quadrant (and/or relatively far from datapoints within the data space) may not be perturbed.

In some embodiments, at least a portion of a gate boundary can be perturbed randomly (e.g., based on a random or pseudo-random number, based on a distribution) and/or within a specified region (e.g., a region defined by a limit). The perturbed gate boundaries can be defined at, for example, the gating module 150 based on an initial gate boundary. One or more perturbed gate boundaries (which are based on an initial gate boundary) and/or the initial gate boundary can collectively be referred to as a set of gate boundaries. In some embodiments, at least a portion of a gate boundary can be perturbed from an initial gate boundary based on an algorithm. In some embodiments, a perturbation of a gate boundary can be implemented by scaling an initial gate boundary. In some embodiments, a gate boundary can be perturbed along an axis (e.g., in a direction of a vector). More details related to, for example, methods for defining a gate boundary (e.g., an initial gate boundary) and/or perturbing a gate boundary are described below. In some embodiments, a perturbation of a gate boundary can be assigned as an initial gate boundary for a set of perturbations.

In some embodiments, a metric defined by the gating module 150 based on a gate boundary (e.g., a perturbed gate boundary, an initial gate boundary) within a data space associated with at least a portion of a dataset can represent an effect of a relationship (e.g., a spatial relationship) between the gate boundary and the dataset. In some embodiments, the metric can be a statistical value calculated based on a relationship between one or more portions of the dataset and the gate boundary. For example, a metric calculated by the gating module 150 can represent a change in a percentage of or an absolute count of datapoints from at least a portion of the dataset included within (or outside of) a gate boundary when the gate boundary is changed. In some embodiments, a portion of the dataset can include (or exclude) datapoints associated with a particular type of biological substance (e.g., a cell, a sample). In some embodiments, for example, a metric calculated by the gating module 150 can represent a standard deviation or average of percentage changes of portions of a dataset included within (or outside of) a gate boundary when the gate boundary is perturbed multiple times.

In some embodiments, a metric can be calculated based on a portion of a dataset that is ungated. For example, a gate boundary can be defined within a data space that includes a first portion of a dataset. The gate boundary can be perturbed based on, for example, a random number. A metric can be calculated based on a second portion of the dataset that is outside of the data space. For example, the second portion of the dataset can be associated with a dimension of the dataset that is not included in the data space or that is not the subject of the gated boundary (or the perturbation). The second portion of the dataset used to calculate the metric can be selected based on a portion of the first portion of the dataset that is affected by the perturbation of the gate boundary. More details related to calculations based on ungated portions of datasets are described in connection with FIG. 12.

In some embodiments, a metric can be calculated based on multiple perturbations of a gate boundary. For example, a portion of a dataset that is included within (e.g., falls within) and/or excluded by two or more different gate boundaries can be calculated and used as a metric. In some embodiments, a metric can be calculated based on, for example, a Tanimoto distance between two or more gate boundaries and/or a Tanimoto coefficient associated with one or more gate boundaries. In some embodiments, a metric can be calculated based on and/or used within various types of statistical models including for example, an analysis of variance (ANOVA) model. In some embodiments, a metric can be based on a fold (e.g., a metric describing a multiplier increase).

In some embodiments, the gating module 150 can be configured to modify a gate boundary a specified number of iterations. In other words, a gate boundary can be perturbed a specified number of times. In some embodiments, a number of perturbations of a gate boundary can be defined based on a user preference (e.g., a user preference stored in memory 130) and/or can be defined randomly. In some embodiments, a number of perturbations of a gate boundary can be determined dynamically (e.g., calculated dynamically) based on a metric satisfying a threshold condition. For example, a gate boundary can be perturbed until a metric calculated based on one or more of the perturbations of the gate boundary exceeds or falls below a specified threshold value (e.g., a specified confidence level, a specified average value).

In some embodiments, the gating module 150 can be configured to define a magnitude of a perturbation of a gate boundary. A magnitude of perturbation can be quantified by, for example, a distance, an average distance, a width of a distribution, etc. between one or more portions of a perturbed gate boundary and an initial gate boundary. A perturbed gate boundary that has a shape that is relatively close to a shape of an initial gate boundary can be referred to as having a small magnitude of perturbation. A perturbed gate boundary that has a shape that is relatively different than a shape of an initial gate boundary can be referred to as having a large magnitude of perturbation. In some embodiments, a magnitude of a perturbation of a gate boundary can be defined based on a user preference (e.g., a user preference stored in memory 130) and/or can be defined randomly. In some embodiments, a magnitude of a perturbation of a gate boundary can be defined based on one or more limits. More details related to limits on perturbations of a gate boundary are described below.

As shown in FIG. 1, the experiment management engine 120 includes a memory 130 (e.g., a random-access memory (RAM), a read-only memory (ROM), a flash memory, a removable memory). The memory 130 can be used by the gating module 150 (and/or the experiment management engine 120) to perform one or more functions of the gating module 150. In some embodiments, the memory 130 can be referred to as a local memory because the memory is local to the experiment management engine 120. In some embodiments, one or more parameter values used to define a gate boundary can be stored in and accessed from the memory 130 by the gating module 150. The parameter values used to define the gate boundary can be stored in the memory 130 after being defined using the gating module 150. In some embodiments, one or more portions of a dataset and/or parameter related to a data space can be stored in and/or accessed from the memory 130. For example, as shown in FIG. 1, one or more portions of a dataset can be received directly from the test device 140 (e.g., received in real-time from the test device 140 as the portion(s) of the dataset are being produced by the test device 140). The portion(s) of the dataset can be stored at the memory 130 until the portion(s) of the dataset are access by the gating module 150.

Although not shown, in some embodiments, the gating module 150 can be configured to access a remote memory (e.g., a memory outside of the experiment management engine, a database). In such instances, the experiment management engine 120 may optionally exclude memory 130. In some embodiments, the remote memory can include one or more portions of datasets from one or more test devices in addition to (or in lieu of) test device 140.

The experiment management engine 120 can be accessed via a user interface 170 (e.g., a graphical user interface (GUI)). The user interface 170 can be configured so that a user can send signals (e.g., control signals, input signals, signals related to instructions) to the experiment management engine 120 and/or receive signals (e.g., output signals) from the experiment management engine 120. Specifically, the user interface 170 can be configured so that the user can trigger one or more functions to be performed (e.g., executed) at the experiment management engine 120 via the user interface 170 and/or receive an output signal from the experiment management engine 120 at, for example, a display (not shown) of the user interface 170. For example, in some embodiments, a user can trigger the gating module 150 to define, modify, and/or select one or more gate boundaries (e.g., initial gate boundaries, perturbed gate boundaries), data spaces, user preferences, and/or datasets via the user interface 170. In some embodiments, the user interface 170 can be a user interface associated with, for example, a personal computer and/or a server. For example, a variety of different combinations and implementations of GUIs may be used.

In some embodiments, one or more portions of the user interface 170, the experiment management engine 120, and/or the test device 140 can be a hardware-based module (e.g., a digital signal processor (DSP), a field programmable gate array (FPGA), a memory), a firmware module, and/or a software-based module (e.g., a module of computer code, a set of computer-readable instructions that can be executed at a computer). In some embodiments, one or more of the functions associated with the user interface 170, the experiment management engine 120, and/or the test device 140 can be included in one or more different modules (not shown). In some embodiments, one or more portions of the user interface 170, the experiment management engine 120, and/or the test device 140 can be a wired device and/or a wireless device (e.g., wi-fi enabled device) and can be, for example, a computing entity (e.g., a personal computing device), a mobile phone, a personal digital assistant (PDA), a server (e.g., a web server/host), and/or so forth. The user interface 170, the experiment management engine 120, and/or the test device 140 can be configured to operate based on one or more platforms (e.g., one or more similar or different platforms) that can include one or more types of hardware, software, firmware, operating systems, runtime libraries, and so forth.

In some embodiments, the user interface 170 (or portion of the user interface 170), the test device 140 (or portion of the test device 140) and/or the experiment management engine 120 (or portion of the experiment management engine 120) can be configured to communicate via a network (not shown). In some embodiments, the network can be, for example, a virtual network, a local area network (LAN) and/or a wide area network (WAN) and can include one or more wired and/or wireless segments. For example, the experiment management engine 120 can be accessed (e.g., manipulated) as a web-based service. Accordingly, the user interface 170 can be, for example, a personal computer, and the experiment management engine 120 can be accessed via, for example, the Internet. In some embodiments, the experiment management engine 120 can be configured to facilitate communication (e.g., collaboration) between users (e.g., users at separate, remote locations).

In some embodiments, the gating module 150 can be configured to perform one or more operations (e.g., execute one or more functions) based on a user preference (e.g., a customizable user preference). In some embodiments, the user preference can be stored in and accessed from the memory 130. The user preference can be defined by a user (e.g., a laboratory technician) of the experiment management engine 120 via, for example, the user interface 170. In some embodiments, at least a portion of the user preference can include, for example, default preferences. In some embodiments, the gating module 150 can be configured to perform one or more functions based on a combination of a user preference and/or a default preference.

In some embodiments, the gating module 150 can be configured to define at least a portion of a gate boundary within a data space (that includes at least a portion of a dataset) based on a user preference. For example, the gating module 150 can be configured to define a gate boundary having a specified number of vertices based on a user preference. In other words, a shape of the gate boundary can be defined based on a user preference.

In some embodiments, the gating module 150 can be configured to modify at least a portion of a gate boundary based on a user preference. For example, a vertex and/or a line segment defining at least a portion of a gate boundary can be modified based on a user preference. In other words, a shape of the gate boundary can be modified based on a user preference.

In some embodiments, the gating module 150 can be configured to define at least a portion of a metric based on a user preference. For example, the gating module 150 can be configured to define a particular type of metric (e.g., a specified type of statistical parameter value) based on a user preference. In some embodiments, the metric can represent a change in a relationship between a gate boundary and at least a portion of a dataset when the gate boundary is changed. For example, a first metric can be defined based on a first gate boundary and a second metric can be defined based on a second gate boundary. A third metric can be defined based on a combination of the first metric and the second metric. In some embodiments, the second gate boundary can be a perturbation of the first gate boundary. In some embodiments, for example, the metric can be based on a Tanimoto distance related to two different boundaries.

In some embodiments, the gating module 150 can be configured to define at least a portion of a data space (e.g., a multi-dimensional data space) and/or define at least a portion of a dataset based on a user preference. For example, the gating module 150 can be configured to define one or more parameters of a data space based on a user preference. In some embodiments, the gating module 150 can be configured to select one or more portions of (e.g., a dimension of, entries within) a dataset based on a user preference.

In some embodiments, the gating module 150 can be configured to define a gate boundary, modify a gate boundary, define a metric, define a data space, process a dataset, and/or so forth based on a default preference. In some embodiments, a default preference can be hard-coded within the experiment management engine 120.

In some embodiments, perturbations of a gate boundary (e.g., an initial gate boundary, another perturbed gate boundary) can be performed in real-time. For example, a gate boundary can be defined and/or perturbed as a portion of a dataset is being defined at the test device 140 and/or received at the experiment management engine 120. In some embodiments, a metric can be defined based on a perturbation of a first gate boundary (performed by the gating module 150) based on a portion of a data received at the experiment management engine 120. A second gate boundary can be defined and perturbed with respect to a later portion of the data received at the experiment management engine 120 based on the metric.

In some embodiments, an experiment being performed at a test device 140 can be modified based on analysis performed at the gating module 150 using one or more gate boundaries. In other words, an experiment can be modified during runtime based on a gating analysis performed at the gating module 150.

In some embodiments, the test device 140 can be, for example, a stress test device, a flow cytometer (e.g., a four-color fluorescence capable flow cytometer such as a FACS-calibur flow cytometer, or higher color capability flow cytometers, such and LSR II or FACS Canto II), a mass spectrometer (e.g., an inductively coupled plasma mass spectrometer (ICP-MS) device such as a PerkinElmer SCIEX), a device configured to test various assays (Enzyme Linked Immuno-Sorbent Assays (ELISA), protein and cell growth assays, assays for molecular interactions, enzyme activity assays, cell toxicity assays, immunoassays, and high throughput screening of compounds and targets in drug discovery such as FLIPR assays), and/or so forth.

In some embodiments, if the test device 140 is a flow cytometer, data processed by the gating module 150 of the experiment management engine 120 can be produced by the flow cytometer. The flow cytometer can be configured to count, examine, and/or sort microscopic particles, such as single cells, suspended in a stream of fluid. The flow cytometer can be configured to simultaneously perform multi-parametric analysis of physical and/or chemical characteristics of single cells flowing through an optical and/or electronic detection apparatus. In some embodiments, the flow cytometer can be configured to measure properties related to individual cells. In some embodiments, a liquid stream in the flow cytometer can be configured to carry and/or align individual cells so that they pass through a laser beam in single file. As a cell passes through a light beam (usually laser light), light is scattered from the cell surface. Photomultiplier tubes can be configured to collect the light scattered in the forward and side directions which gives information related to the cell size and shape. This information may be used to identify the general type of cell (e.g. monocyte, lymphocyte, or granulocyte). In some embodiments, a flow cytometer can include multiple light sources and/or detectors.

In some embodiments, fluorescent molecules (fluorophores) can be conjugated with antibodies and associated with components of a cell that are analyzed by a flow cytometer and output as data that can be processed by the gating module 150 of the experimental management engine 120. Fluorophores can be activated by the laser and re-emit light of a different wavelength. Since these antibodies can bind to antigens in or around the cells, the amount of light detected from the fluorophores is related to the number of antigens associated with the cell passing through the beam. Any specific set of fluorescently tagged antibodies in any embodiment can depend on the types of cells to be studied. Several tagged antibodies can be used simultaneously, so measurements made as one cell passes through the laser beam consist of scattered light intensities as well as emitted light intensities from each of the fluorophores. Thus, the characterization of a single cell can consist of a set of measured light intensities that may be represented as a coordinate position in a multi-dimensional space. Considering only the light from the fluorophores, there is one coordinate axis corresponding to each of the fluorescently tagged antibodies. The number of coordinate axes (the dimension of the space) is the number of fluorophores used. Modem flow cytometers can measure several colors associated with different fluorophores and thousands of cells per second. Thus, the data from one subject can be described by a collection of measurements related to the number of antigens for each of (typically) many thousands of individual cells. More details related to data produced by a flow cytometer are described in a co-pending U.S. patent application Ser. No. 12/501,274, filed on Jul. 10, 2009, entitled, "Methods and Apparatus Related to Management of Experiments," which is incorporated by reference herein in its entirety. In some embodiments, the functions described in connection with FIG. 1 can be applied to a multi-dimensional data space and/or a gate boundary that includes more than two dimensions).

Figure 2:
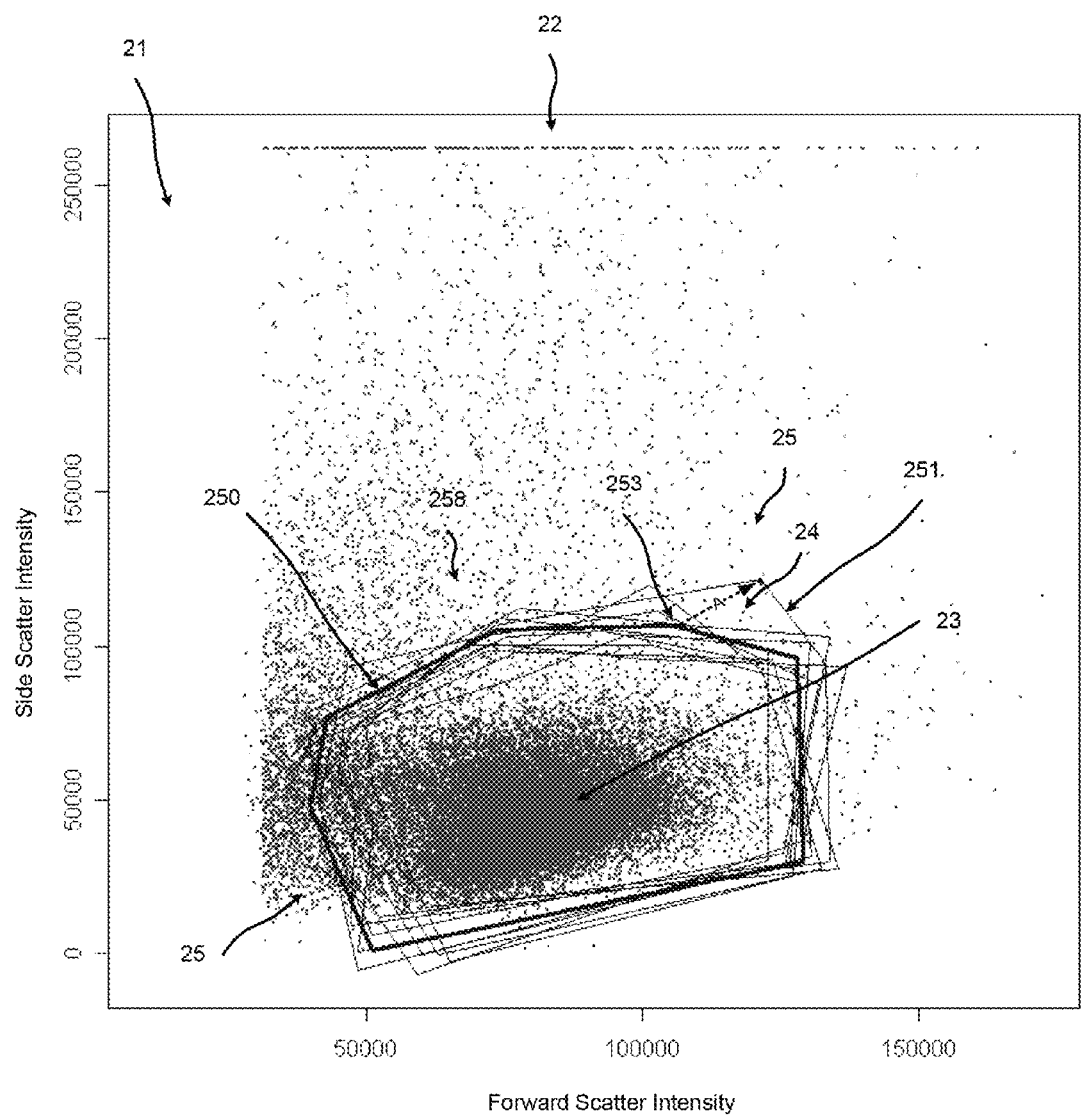
FIG. 2 is a schematic diagram that illustrates perturbations of a gate boundary within a data space that includes datapoints from a dataset, according to an embodiment

FIG. 2 is a schematic diagram that illustrates perturbations of a gate boundary 250 within a data space 21 that includes datapoints from a dataset 22, according to an embodiment. As shown in FIG. 2, the data space 21 is a two-dimensional data space and datapoints defining the dataset 22 are plotted within the data space 21. Each of the datapoints shown in FIG. 2 is defined by a forward scatter intensity value (x-axis) and a side scatter intensity value (y-axis) produced by testing of a cell within a flow cytometer.

In this embodiment, an initial gate boundary 250 is defined within the data space 21 around a portion of the dataset 22 that includes a dense portion 23 of datapoints from the dataset 22 within the initial gate boundary 250. One or more datapoints inside of the initial gate boundary 250 (or any other gate boundary) can be referred to as being included in, or being inside of the initial gate boundary 250. One or more datapoints outside of the initial gate boundary 250 (or any other gate boundary) can be referred to as being excluded from, or being outside of the initial gate boundary 250. As shown in FIG. 2, the initial gate boundary 250 is defined within the data space 21 as a polygonal gate boundary with seven vertices and with straight line segments between the vertices. In some alternative embodiments, the initial gate boundary 250 could have less or more vertices and/or could have non-straight lines between the vertices. In some alternative embodiments, the initial gate boundary 250 may not have vertices.

The initial gate boundary 250 can be defined by, for example, a gating module (not shown). In some embodiments, the initial gate boundary 250 can be defined by a user and/or can be defined based on, for example, a user preference. In some embodiments, the initial gate boundary 250 can be drawn by a user via a user interface such as user interface 170 shown in FIG. 1. In some embodiments, an initial gate boundary 250 (such as initial gate boundary 250) can be automatically defined by a gating module based on, for example, a density of datapoints within the dataset 22. For example, an initial gate boundary (such as initial gate boundary 250) can be automatically defined by a gating module to circumscribe a specified portion of the dataset 22 based on one or more conditions. In some embodiments, the automatically defined initial gate boundary can be modified by a user via, for example, a user interface.

As shown in FIG. 2, the initial gate boundary 250 is perturbed multiple times within the data space 21. Gate boundaries modified based on the initial gate boundary 250 can be referred to as perturbed gate boundaries, jittered gate boundaries, or as modified gate boundaries. The perturbations of the initial gate boundary 250 shown in FIG. 2 can collectively be referred to as perturbed gate boundaries 258 or as a set of perturbed gate boundaries 258. As shown in FIG. 2, a perturbation of the initial gate boundary 250 is shown as perturbed gate boundary 251 (which is included in the perturbed gate boundaries 258). In some embodiments, the initial gate boundary 250 and/or the perturbed gate boundaries 258 can be referred to generically as gate boundaries. The initial gate boundary 250 and/or one or more of the perturbed gate boundaries 258 can collectively be referred to as a set of gate boundaries.

As shown in FIG. 2, a portion 24 of the dataset 22 is included within the perturbed gate boundary 251, but is outside of the initial gate boundary 250. In other words, a region (e.g., a mathematically defined region) defined by the initial gate boundary 250 and the perturbed gate boundary 251 includes the portion 24 of the dataset 22. As shown in FIG. 2, a portion 25 of the dataset 22 is outside of both of the initial gate boundary 250 and the perturbed gate boundary 251.

As shown in FIG. 2, at least a portion of the perturbed gate boundary 251 is defined by moving a vertex 253 of the initial gate boundary 250 in a vector direction A having both an x-component and a y-component. In some embodiments, the vector direction A can be defined based on a random number (e.g., a pseudo-random number). For example, the vertex 253 can be moved in a vector direction having a randomly defined x-component and/or a randomly defined y-component. Although not shown in FIG. 2, in some embodiments, a perturbed gate boundary can be defined based on movement of a single vertex of an initial gate boundary.

In some embodiments, a first metric can be calculated (e.g., calculated by a gating module based on a user preference) based on the portion(s) of the dataset 22 included within (or excluded from) the initial gate boundary 250, and a second metric can be calculated based on the portion(s) of the dataset 22 included within (or excluded from) the perturbed gate boundary 251. In some embodiments, the first metric and/or the second metric can be displayed to a user via a user interface (or stored in a file). In some embodiments, a metric can be calculated based on a difference between the portion(s) of the dataset 22 included within (or excluded from) the initial gate boundary 250 and the portion(s) of the dataset 22 included within (or excluded from) one or more of the perturbed gate boundaries 258. In some embodiments, one or more metrics can be calculated based on differences between relationships (e.g., spatial relationships) between the dataset 22 and two or more of the perturbed gate boundaries 258.

In some embodiments, one or more metrics defined based on a set of gate boundaries (e.g., the initial gate boundary 250 and/or one or more of the perturbed gate boundary 258) can be used (e.g., by a gating module) to select a gate boundary (such as the initial gate boundary 250) from the set of gate boundaries. In some embodiments, the gate boundary can be selected from the set of gate boundaries based on the metric satisfying a specified condition. For example, the perturbed gate boundary 251 can be selected from a set of gate boundaries that includes the perturbed gate boundaries 258 based on a metric calculated based on the perturbed gate boundary 251, for example, exceeding a threshold value. In some embodiments, the perturbed gate boundary 251 can be selected from the perturbed gate boundaries 258 based on a metric calculated based on the perturbed gate boundary 251 matching a condition better than metrics calculated based on the initial gate boundary 250 and/or the other perturbed gate boundaries 258.

In some embodiments, a gate boundary can be selected by a user from multiple gate boundaries (e.g., multiple initial gate boundaries, multiple candidate gate boundaries) in view of metrics calculated based on perturbations of each gate boundary from the multiple gate boundaries. One or more gate boundaries from the multiple gate boundaries can be defined by a user. In some embodiments, a gate boundary can be selected by, for example, a gating module from multiple gate boundaries based on one or more conditions (e.g., threshold conditions) and/or procedures (e.g., algorithms) related to metrics calculated based on perturbations of each gate boundary from the multiple gate boundaries. One or more gate boundaries from the multiple gate boundaries can be defined by, for example, a gating module.

In some embodiments, a selected gate boundary can be used to define a metric related to a dataset different than dataset 22. In other words, a gate boundary (such as one of the perturbed gate boundaries 258) selected based on a metric calculated using dataset 22 can be used to separate datapoints associated with a dataset different than dataset 22. For example, the selected gate boundary can be used as a template with respect to another dataset. In some embodiments, the selected gate boundary can be used to separate cells in a particular fashion (as determined based on a metric). Accordingly, the selected gate boundary can be used (e.g., used as a template gate boundary) to separate cells associated with one or more datasets in the particular fashion.

In some embodiments, the dataset 22 (or another dataset) can be used as a control dataset (e.g., a control dataset including actual measured data from a sample, a control dataset including simulated data) used to define and/or select a gate boundary that can be used as a template gate boundary for non-control datasets. In some embodiments, the dataset 22 can be a non-control dataset. In some embodiments, a selected gate boundary can be used as a gate boundary (e.g., a template) within a data space different from or the same as data space 21.

In some embodiments, the initial gate boundary 250 shown in FIG. 2, can be a gate boundary selected based on a prior set of perturbations (not shown) of a different gate boundary (not shown) with respect to dataset 22 (and/or a different dataset). It logically follows that the perturbed gate boundaries 258 shown in FIG. 2 can be perturbations based on a gate boundary selected based on a prior set of perturbed gate boundaries.

In some embodiments, a sensitivity associated with the initial gate boundary 250 can be calculated (e.g., calculated by a gating module) based on perturbations of the initial gate boundary 250 within the data space 21 associated with the dataset 22. For example, a set of metrics can be defined based on relationships between the perturbed gate boundaries 258 and the dataset 22. If the metric values vary in a relatively large fashion, the initial gate boundary 250 can be classified as a sensitive gate boundary. The metric values can vary in a relatively large fashion because the initial gate boundary 250 (and/or the perturbed gate boundaries 258) can be in a location that includes a dense concentration of datapoints. Accordingly, when the initial gate boundary 250 is perturbed to define the perturbed gate boundaries 258, metric values calculated based on relationships between the datapoints of the dense concentration of datapoints within the dataset 22 and the perturbed gate boundaries 258 can change in a relatively significant fashion. In some embodiments, the dense concentration of datapoints can be identified as a sensitive region of datapoints within the dataset 22. In some embodiments, a set of a gate boundary (e.g., perturbations of at least a portion (such as a single vertex) of a gate boundary) within a data space that includes a dataset (e.g., dataset 22) can be used to identify a dense population of datapoints within the data space. More details related to sensitivity of a gate boundary are discussed below.

The perturbed gate boundaries (such as perturbed gate boundary 250) are shown in FIG. 2 to illustrate the differences between the perturbed gate boundaries and the initial gate boundary 250. In some embodiments, perturbed gate boundaries may be defined at overlapping or mutually exclusive times from the initial gate boundary 250. In some embodiments, perturbed gate boundaries and/or the initial gate boundary 250 may or may not be triggered for display (e.g., triggered by display by a gating module) at, for example, a user interface.

In some embodiments, gate boundaries can be logically related (e.g., hierarchically related). For example, a portion of a dataset that falls within a region of gate boundaries (and/or perturbations thereof) that are intersecting (e.g., overlapping) in one or more dimensions can be used to define a new dataset. Specifically, the dataset 22 shown in FIG. 2 can be defined based on a prior gate boundary (and/or perturbations of the prior gate boundary) (the prior gate boundary not shown in FIG. 2). For example, the datapoints defining dataset 22 can be selected from a superset of the dataset 22 based on the datapoints having a particular relationship with respect to the prior gate boundary (e.g., being inside of the prior gate boundary).

Similarly, in some embodiments, one or more datapoints from the dataset 22 can be selected and used for processing with respect to a subsequent gate boundary (and/or perturbations thereof) based on relationship(s) of the datapoint(s) of the dataset 22 with respect to the initial gate boundary 250 and/or one or more of the perturbed gate boundaries 258. The datapoints from the dataset 22 can be processed within data space 21 and/or a different data space. In other words, the dataset 22 can have portions that are overlapping (e.g., are a superset) a dataset that is processed with respect to another subsequent gate boundary (and perturbations thereof).

Although not shown, in some embodiments, a perturbation of a gate boundary (such as gate boundary 250) can include a removal of a vertex (such as vertex 253) or an addition of a vertex. In other words, an initial gate boundary can have more or less vertices than a perturbation of the initial gate boundary. In some embodiments, the techniques described in connection with FIG. 2 can be applied to a multi-dimensional data space and/or a gate boundary that includes more than two dimensions.

Figure 3:
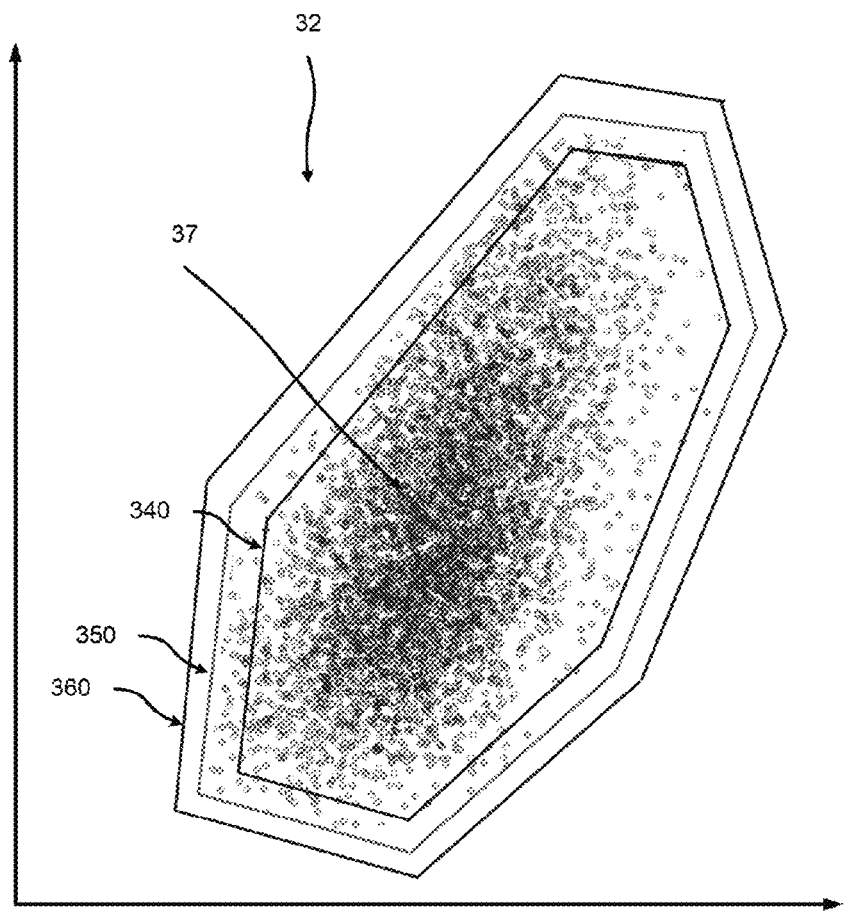
FIG. 3 is a schematic diagram that illustrates perturbed gate boundaries scaled from an initial gate boundary, according to an embodiment.

FIG. 3 is a schematic diagram that illustrates perturbed gate boundaries scaled from an initial gate boundary 350, according to an embodiment. As shown in FIG. 3, the initial gate boundary 350 is defined within a two-dimensional data space 32 that includes a dataset 37. As shown in FIG. 3, a perturbation of the initial gate boundary 350 is labeled as perturbed gate boundary 340, and another perturbation of the initial gate boundary 350 is labeled as perturbed gate boundary 360. The initial gate boundary 350, the perturbed gate boundary 340 and/or the perturbed gate boundaries 360 can collectively define a set of gate boundaries.

As shown in FIG. 3, the perturbed gate boundary 340 is a scaled-down version of the initial gate boundary 350. In other words, a region of the data space 32 within the perturbed gate boundary 340 is smaller than a region of the data space 32 within the initial gate boundary 350. The perturbed gate boundary 350 is a scaled-up version of the initial gate boundary 350. In other words, a region of the data space 32 within the perturbed gate boundary 360 is larger than the region of the data space 32 within the initial gate boundary 350.

In some embodiments, the perturbed gate boundary 340 and/or the perturbed gate boundary 360 can be scaled based on a scalar and/or based on an algorithm. For example, each of the vertices of perturbed gate boundary 360 can be moved so that the perturbed gate boundary includes an area is X times larger than that of the initial gate boundary 350. In some embodiments, each of the vertices of perturbed gate boundary 360 can be a specified distance (e.g., a scalar) from the vertices of the initial gate boundary 350. In some embodiments, the scaling can be performed based on a random number. For example, each of the vertices of perturbed gate boundary 360 can be a specified distance (e.g., a scalar) from the vertices of the initial gate boundary 350. The specified distance can be defined based on a random number and/or based on an algorithm. In some embodiments, the perturbed gate boundary 360, for example, can be defined by moving the vertices of (or other portions of) the initial gate boundary 350 a specified distance from a centroid of the initial gate boundary 350.

As shown in FIG. 3, the initial gate boundary 350 does not intersect with the perturbed gate boundary 340 or the perturbed gate boundary 360. In some alternative embodiments (not shown), a perturbed gate boundary can have portions that are scaled and some portions that are not scaled. For example, some vertices of a portion of the perturbed gate boundary 340 can be scaled based on a scalar, while the remaining vertices of the perturbed gate boundary 340 can be defined randomly. In such instances, portions of the initial gate boundary 350 may intersect the perturbed gate boundary 340. In some embodiments, the techniques described in connection with FIG. 3 can be applied to a multi-dimensional data space and/or a gate boundary that includes more than two dimensions.

Figure 4:
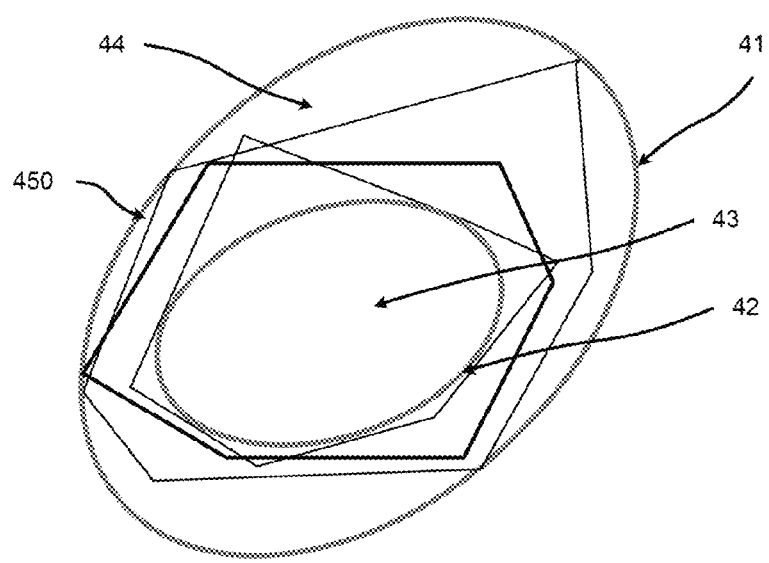
FIG. 4 is a schematic diagram that illustrates a static region and a dynamic region defined based on limits, according to embodiment.

FIG. 4 is a schematic diagram that illustrates a static region 43 and a dynamic region 44 defined based on limits, according to embodiment. As shown in FIG. 4, the dynamic region 44 is defined by a region between a limit 41 and a limit 42. In this embodiment, the limit 41 can be an upper boundary/limit (and can be referred to as such) and the limit 42 can be a lower boundary/limit (and can be referred to as such). The gate boundaries 450 can be defined so that they are within the dynamic region 44 (and fall outside of the static region 43). One or more of the gate boundaries 450 can be a perturbation of an initial gate boundary. Accordingly, the static region 43 functions as an exclusion zone. Also as shown in FIG. 4, the static region 43 is defined as a region within the second limit 42.

Although not shown, in some alternative embodiments, a dynamic region can be defined as a region outside of the limit 42, which functions as a lower limit. In other words, the dynamic region can be defined without the limit 41 (or no upper limit). Accordingly, one or more of the gate boundaries 450 can be defined so that they are outside of the static region 43 and only included in the dynamic region 44.

In some alternative embodiments, a dynamic region can be defined by only an upper limit (and no lower limit). Accordingly, one or more of the gate boundaries 450 (e.g., an initial gate boundary, a perturbed gate boundary) can be defined so that they fall within the first limit 41 (and outside of the second limit 42). In such instances, only a gate bounded dynamic region will be present and a static region may not be present.

In some alternative embodiments, a dynamic region (such as dynamic region 44) can be defined so that a specified percentage of perturbations of one or more of gate boundaries 450 (e.g., vertices of a gate boundary) fall within the dynamic region 44. In some alternative embodiments, a dynamic region can be defined so that even though an initial gate boundary from the gate boundaries 450 falls outside of a dynamic region, while perturbations of the initial gate boundary fall within the dynamic region. In some alternative embodiments, a dynamic region can be defined so that perturbations of an initial gate boundary from the gate boundaries 450 fall outside of the dynamic region. Although not shown, in some embodiments, one or more limits can be defined so that a perturbation of a gate boundary has a specified magnitude of perturbation. In some embodiments, the magnitude of perturbation can be defined based on an initial gate boundary.

Although not shown, in some embodiments, more than two limits can be applied within a data space. In some embodiments, limits can be changed dynamically as one or more of the gate boundaries 450 are defined. For example, a first set of limits can be applied to a first set of perturbations of an initial gate boundary and a second set of limits can be applied to a second set of perturbation of the initial gate boundary (or a different initial gate boundary). In some embodiments, the limits can be defined based on a user preference. In some embodiments, limits can be defined by a user via a user interface (such as that shown in FIG. 1).

In this embodiment, portions (e.g., datapoints) of a dataset that fall within static region 43 are calculated in a different fashion from portions of the dataset that fall within the dynamic region 44. For example, a metric calculated based on a portion of a dataset that falls within the static region 43 can be combined with metrics calculated based on a portion of a dataset that falls within the dynamic region 44. The metric calculated based on the portion of the dataset that falls within the static region 43 can be referred to as a static metric and the metrics calculated based on the portion of the dataset that falls within the dynamic region 44 can be referred to as a dynamic metric. The static metric can be referred to as such because the static metric can be a static value regardless of perturbations of a gate boundary that occur within the dynamic region 44. In other words, the gate boundaries 450 (including perturbed gate boundaries) fall outside of the static region 43, and thus, do not result in changes in relationship between the gate boundaries 450 and the dataset within the static region 43. Accordingly, the static metric need not be calculated more than once. A set of metrics can be calculated based on a combination of the static metric and the dynamic metrics. By separating the calculations within the static region 43 and the dynamic region 44, processing of, for example, a gating module can be utilized in an efficient fashion.

In some embodiments, one or more metrics can be calculated by, for example, a gating module based only on a portion of a dataset that is included in the dynamic region 44. Moreover, portions of the dataset included in the static region 43 can be ignored during analysis. In some embodiments, portions of a dataset outside of the dynamic region 44 (and outside of the static region 43) can be ignored during analysis.

In some embodiments, the static region 43 and the dynamic region 44 can be defined after the gate boundaries 450 (which can include an initial gate boundary and/or perturbations of the initial gate boundary) have been defined (e.g., defined based on an indicator of a magnitude of perturbations). For example, the inner-most portions of the gate boundaries 450 (which can include more than one of the gate boundaries 450) can be detected by, for example, a gating module and used to define the limit 42 (which can be a different shape than that shown in some alternative embodiments). Similarly, the outer-most portions of the gate boundaries 450 (which can include more than one of the gate boundaries 450) can be detected by, for example, a gating module and used to define the limit 41 (which can be a different shape than that shown in some alternative embodiments). Accordingly, one or more metrics (e.g., a sensitivity value) can be calculated based on portions of datasets included (or excluded) from the static region 43 and/or the dynamic region 44 defined based on the limit 41 and the limit 42.

In some embodiments, one or more limits may be fitted around and/or within gate boundaries based on one or more conditions. For example, a limit may be mathematically fitted around the outer-most portions of a set of gate boundaries, such that the limit is separated from the outer-most portions of the set of gate boundaries by a buffer area. Similarly, a limit may be mathematically fitted within the inner-most portions of a set of gate boundaries, such that the limit is separated from the inner-most portions of the set of gate boundaries by a buffer area.

In some embodiments, more than one static region and/or more than one dynamic region can be defined within a data space. In some embodiments, the dynamic region(s) can be mutually exclusive or overlapping. In some embodiments, the static region(s) can be mutually exclusive or overlapping. Calculations associated with different dynamic region(s) (and/or static regions) can be performed based on a different frequency. Accordingly, a number of metrics included in a set of metrics associated with a first dynamic region can be different than a number of metrics included in a set of metrics associated with a second dynamic region. In some embodiments, a region outside of limit 41 can be considered a static region. In some embodiments, the techniques described in connection with FIG. 4 can be applied to a multi-dimensional data space and/or a gate boundary that includes more than two dimensions.

Figure 5:
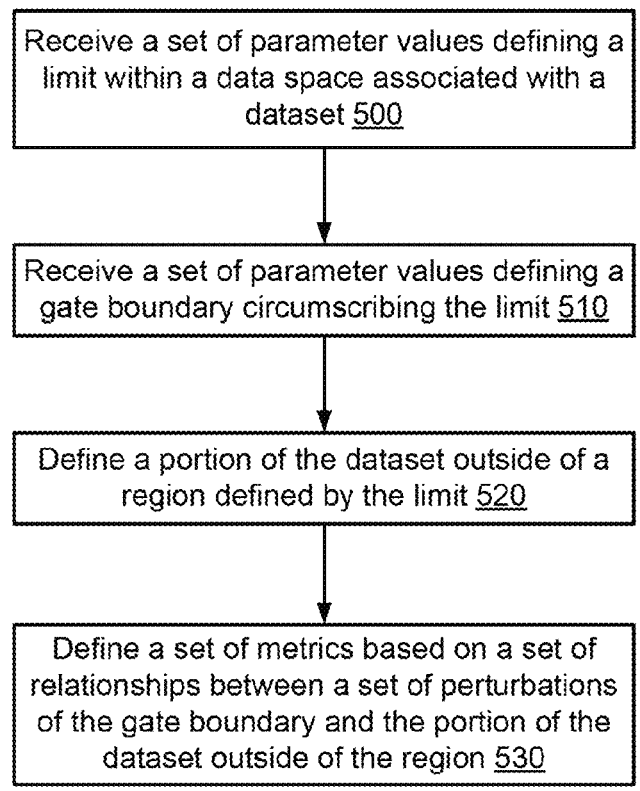
FIG. 5 is a flowchart that illustrates a method for defining a metric based on a portion of a dataset outside of a region defined by a boundary, according to an embodiment.

FIG. 5 is a flowchart that illustrates a method for defining a metric based on a portion of a dataset outside of a region defined by a limit, according to an embodiment. As shown in FIG. 5, a set of parameter values defining a limit within a data space associated with a dataset is received, at 500. In some embodiments, the limit can be referred to as a boundary. In some embodiments, the set of parameter values can be included in a data space including the dataset. In some embodiments, the set of parameter values can be defined by, for example, a user via a gating module of an experiment management engine. In some embodiments, the set of parameter values can be defined, at least in part, based on a user preference. In some embodiments, the limit can be an open shape (a non-closed shape).

A set of parameter values defining a gate boundary circumscribing the limit is received, at 510. The set of parameter values associated with the gate boundary can be included in the data space associated with the dataset. In some embodiments, the gate boundary can be an initial gate boundary and/or can be a perturbed gate boundary.

A portion of the dataset outside of a region defined by the limit is defined, at 520. The region outside of the limit can be a dynamic region. In some embodiments, the dynamic region can be a region (e.g., a mathematically defined region) within which perturbations of a gate boundary are performed.

A set of metrics is defined based on a set of relationships between a set of perturbations of the gate boundary and the portion of the dataset outside of the region, at 530. In some embodiments, one or more metrics from the set of metrics can be combined (e.g., logically combined, mathematically combined) within a metric (e.g., a static metric) calculated based on a portion of the dataset included in a region (e.g., a static region) within the limit. In some embodiments, the method described in connection with FIG. 5 can be applied to a multi-dimensional data space and/or a gate boundary that includes more than two dimensions.

Figure 6:
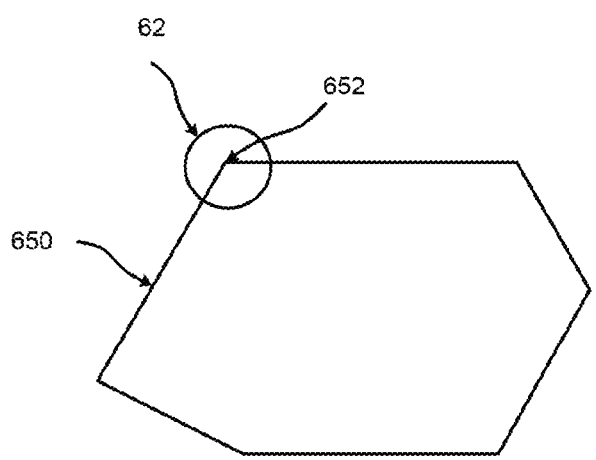
FIG. 6 is a schematic diagram that illustrates a limit around a vertex of an initial gate boundary, according to an embodiment.

FIG. 6 is a schematic diagram that illustrates a limit 62 around a vertex 652 of an initial gate boundary 650, according to an embodiment. In some embodiments, the limit 62 can be referred to as a boundary. In this embodiment, the limit 62 defines a region within which the vertex 652 of the initial gate boundary 650 can be moved (e.g., randomly moved) during perturbations of the initial gate boundary 650. In some embodiments, other vertices of the initial gate boundary 650 (not labeled) can similarly be bounded by limits such as limit 62.

In some embodiments, the limit 62 can have a different shape (e.g., an elliptical shape, a rectangular shape, a discontinuous shape, a non-closed shape/line) than that shown in FIG. 6. In some embodiments, the limit 62 can be defined based on a user preference. In some embodiments, one or more lines of the initial gate boundary 650 can similarly be bounded by limits (e.g., linear limits, non-linear limits) within which perturbations can be implemented.

In some embodiments, the limit 62 (and/or other limits described within this application) can define or can be an indicator of for example, a spread (e.g., a standard deviation) within which random perturbations can be defined. For example, the limit 62 can be an indicator of a standard deviation of a normal distribution within which the vertex 652 can be randomly perturbed. In such instances, one or more perturbations could fall outside of a region circumscribed by the limit 62. In some embodiments, the limit 62 can be a hard limit defined so that perturbations of the vertex 652 cannot fall outside of (or within) a region defined by the limit 62. In some embodiments, the techniques described in connection with FIG. 6 can be applied to a multi-dimensional data space and/or a gate boundary that includes more than two dimensions.

Figure 7A:
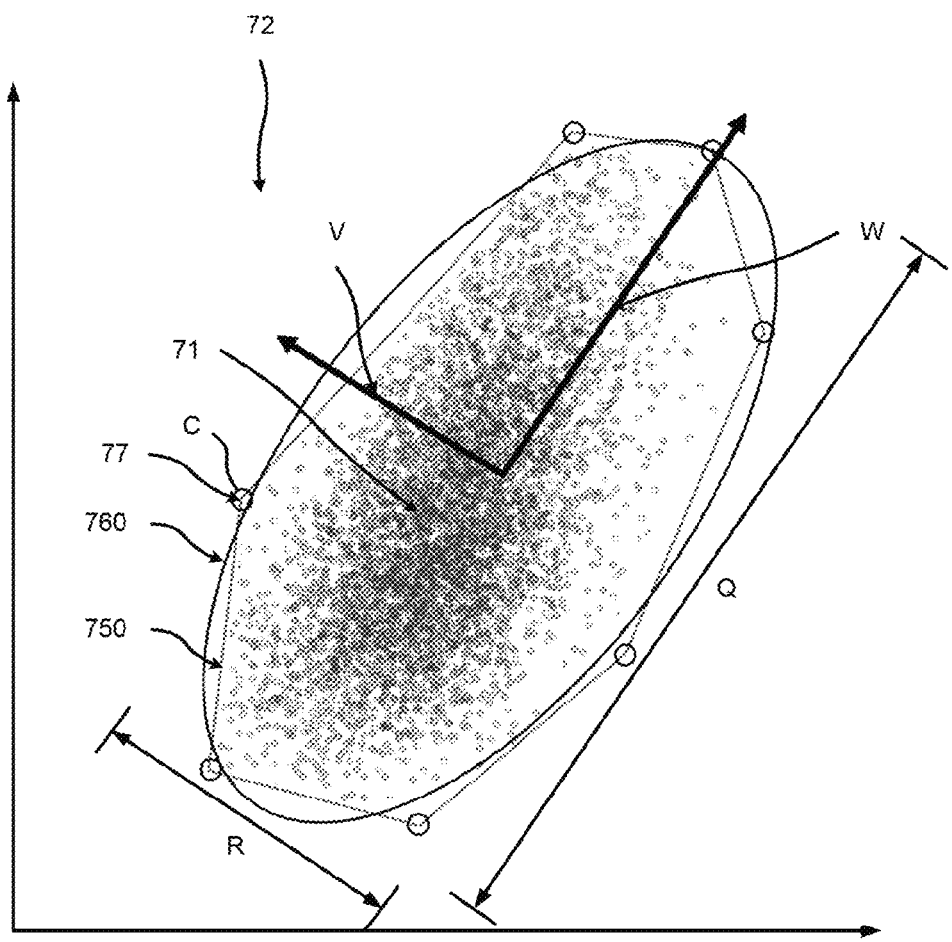
FIG. 7A is a schematic diagram that illustrates vectors used to define perturbations of a gate boundary, according to an embodiment.

FIG. 7A is a schematic diagram that illustrates vectors used to define perturbations of a gate boundary 750, according to an embodiment. As shown in FIG. 7A, a dataset 71 (or an oblong shape fitted to the dataset 71) within a data space 72 roughly has a length Q (which is aligned along a major axis of the dataset 71 (or an oblong shape fitted to the dataset 71)) and a width R (which is aligned along a minor axis of the dataset 71 (or an oblong shape fitted to the dataset 71)). A vector W is aligned along a lengthwise portion of a dataset 71, and a vector V is oriented non-parallel (e.g., perpendicular) to the vector W. The vector V can be referred to as a minor vector (which is aligned along a minor axis of the oblong shape), and vector W can be referred to as a major vector (which is aligned along a major axis of the oblong shape). In some embodiments, the vector W and/or the vector V can be, for example, eigenvectors scaled based on eigenvalues. In other words, the magnitude of perturbation along these vectors can be a function of eigenvalues. In some embodiments, the eigenvalues and/or eigenvectors can be calculated based on simulated datapoints and/or actual datapoints from a dataset.

In some embodiments, perturbations of the gate boundary 750 can be defined based on the vectors. For example, the vertex 77 of the gate boundary 750 can be modified along the minor axis less than the vertex 77 is modified along the major axis based on the vector V and the vector W, respectively.

In some embodiments, vectors (e.g., eigenvectors) used for perturbations of a gate boundary can be defined based on a shape (e.g., a rectangle, a circle) mathematically fitted to a dataset. For example, as shown in FIG. 7A, an area defined by the dataset 71 can be approximated by an ellipse 760. The vector V and the vector W can be defined based on the minor axis and major axis of the ellipse 760, respectively.

In some embodiments, one or more eigenvectors and/or one or more eigenvalues can be calculated (e.g., calculated by a gating module) based on simulated data points (not shown in FIG. 7A) randomly generated within a gated boundary (such as gated boundary 750) and/or within a shape fitted to a dataset (such as dataset 71). In some embodiments, one or more eigenvectors and/or one or more eigenvalues can be calculated based on simulated data points randomly generated within a shape fitted to a dataset so that the eigenvector(s) can be defined independent of a gated boundary and/or independent of the dataset. Accordingly, the perturbations of the gated boundary can be defined based on the shape of the dataset (rather than based on the shape of the gated boundary). In some embodiments, one or more eigenvectors and/or one or more eigenvalues can be calculated based on a shape fitted to simulated data points (not shown in FIG. 7A) randomly generated within a gated boundary. In some embodiments, a shape (such as an ellipse) can be fitted to a gated boundary, and one or more eigenvectors and/or one or more eigenvalues can be calculated based on simulated data points randomly generated within the shape.

Figure 7B:
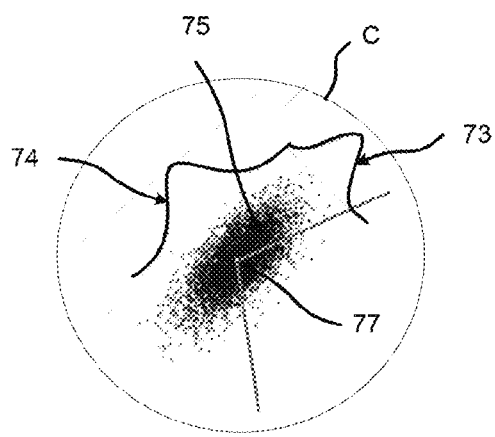
FIG. 7B is a schematic diagram that illustrates a distribution of vertex perturbations associated with the vertex shown in FIG. 7A, according to an embodiment.

FIG. 7B is a schematic diagram that illustrates a distribution of vertex perturbations associated with the vertex 77 shown in FIG. 7A, according to an embodiment. Specifically, as shown in view C of FIG. 7B, the distribution of the vertex perturbations associated with (e.g., around) vertex 77 have a normal (e.g., Gaussian) distribution 73 about an axis aligned with vector V, and a normal distribution 74 about an axis aligned with vector W. The vertex perturbations can be potential vertex perturbations that could be used to perturb a gate. As shown in FIG. 7B, the normal distribution 74 (e.g., a standard deviation of the normal distribution 74) is wider than the normal distribution 73 (e.g., a standard deviation of the normal distribution 73). In some embodiments, if the vectors shown in FIG. 7A are a representation of combinations of eigenvectors and eigenvalues, the difference in widths of the distributions can be defined by (e.g., is proportional to) the eigenvalues.

In some embodiments, a distribution of vertex perturbations associated with vertex 77 can have a non-normal distribution. For example, the distribution can be a square distribution, a uniform distribution, and/or so forth. In some embodiments, vertex perturbations (or other types of perturbations) can be defined based on samples from an N-dimensional Gaussian distribution based on the co-variance matrix. In some embodiments, the techniques described in connection with FIGS. 7A through 7B can be applied to a multi-dimensional data space and/or a gate boundary that includes more than two dimensions.

Figure 8:
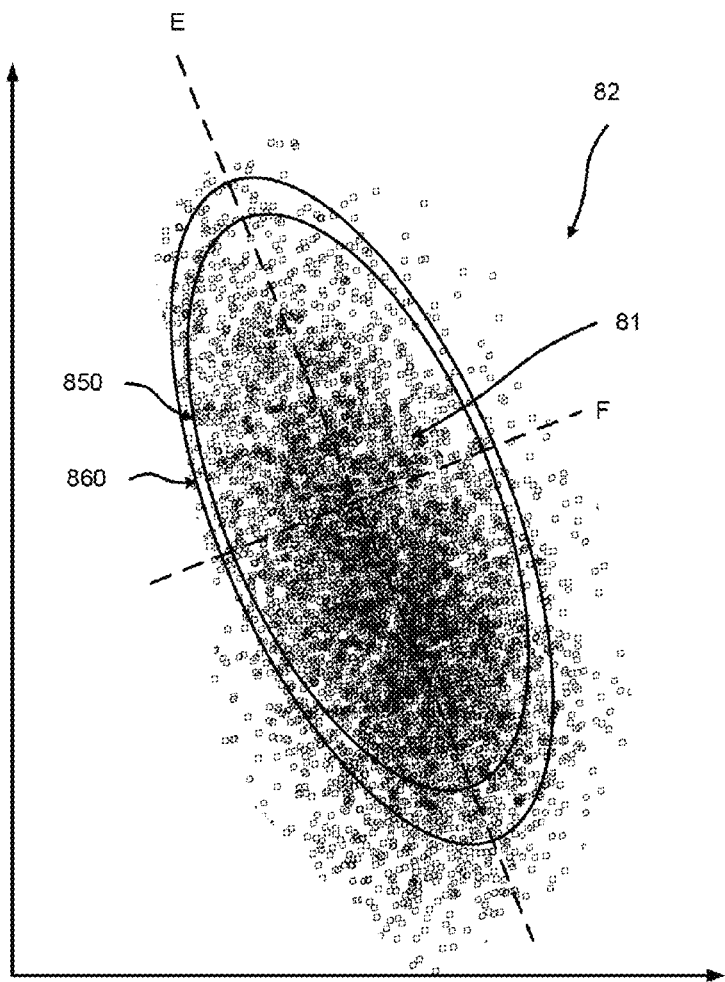
FIG. 8 is a schematic diagram of an initial gate boundary that has an elliptical shape, according to an embodiment.

FIG. 8 is a schematic diagram of an initial gate boundary 850 that has an elliptical shape, according to an embodiment. The initial gate boundary 850 is shown within a data space 82 that also includes a dataset 81. As shown in FIG. 8, the initial gate boundary 850 does not have any vertices that can be perturbed by, for example, a gating module. In some embodiments, any shape can be used as a gate boundary. For example, in some embodiments, a gate boundary can be a circle or can have an irregular shape with or without edges. In some embodiments, one or more portion of a gate boundary can have a symmetrical shape (such as elliptical gate boundary 850), or can have a non-symmetrical shape. In some embodiments, one or more portions of a gate boundary can have smooth portions (e.g., curved portions), can have non-smooth portions, can have discontinuities, and/or so forth.

A perturbation of the initial gate boundary 850 is shown in FIG. 8 as perturbed gate boundary 860. The perturbed gate boundary 860 is a scaled-up version of the initial gate boundary 850. Accordingly, the perturbed gate boundary 860, like the initial gate boundary 850, has an elliptical shape. As shown in FIG. 8, the perturbed gate boundary 860 is scaled along axis E more than the along axis F so that a distance between the perturbed gate boundary 860 and the initial gate boundary 850 along the E axis is greater than a distance between the perturbed gate boundary 860 and the initial gate boundary 850 along the F axis.

Although not shown, in some embodiments, a perturbed gate boundary can be scaled from the initial gate boundary 850 along axis E in a direction opposite that shown in FIG. 8 and/or scaled along axis F in a direction opposite that shown in FIG. 8. In some alternative embodiments, the initial gate boundary 850 can be perturbed (to produce a perturbed gate boundary) only along the E axis (in either direction) or only along the F axis (in either direction). In some embodiments, the initial gate boundary 850 can be perturbed by rotating the initial gate boundary 850 and/or by translating the initial gate boundary 850. Translating the initial gate boundary 850 can be performed by perturbing a centroid of the initial gate boundary 850. In some embodiments, the initial gate boundary 850 can be perturbed by changing the smooth elliptical shape to a polygonal shape that includes, for example, a vertex. In some embodiments, the techniques described in connection with FIG. 8 can be applied to a multi-dimensional data space and/or a gate boundary that includes more than two dimensions.

Figure 9:
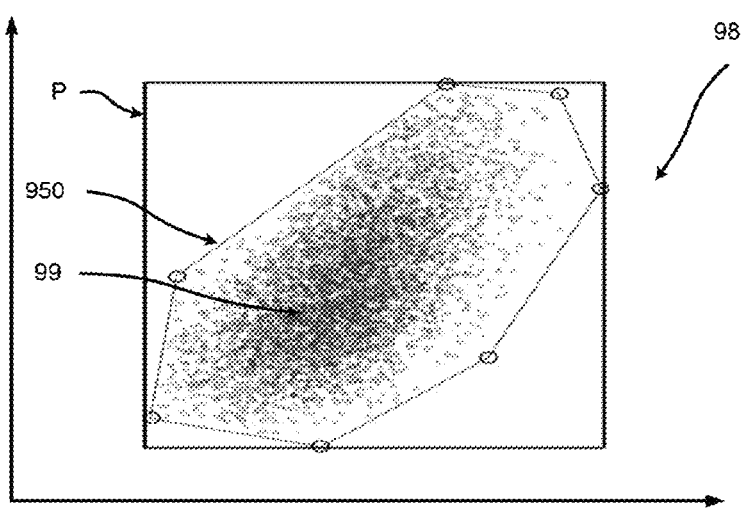
FIG. 9 is a schematic diagram that illustrates a bounding shape around a gate boundary, according to an embodiment.

FIG. 9 is a schematic diagram that illustrates a bounding shape P around a gate boundary 950, according to an embodiment. As shown in FIG. 9, the bounding shape P is a rectangle that completely surrounds the gate boundary 950 within a data space 98. Accordingly, the bounding shape P can be referred to as a bounding box. In some embodiments, the bounding shape P can be referred to as a limit. As shown in FIG. 9, datapoints from a dataset 99 are included in the data space 98.

In some embodiments, the gate boundary 950 can be perturbed within the bounding shape P. In other words, a set of gate boundaries can be defined based on the gate boundary 950 so that each of the gate boundaries is disposed within the bounding shape P. In some embodiments, the bounding shape P can be a shape size (e.g., a minimum box size, a minimum area, a minimum width) that can be mathematically fitted to the gate boundary 950 within certain bounds (e.g., confidence levels, padding limits). In some embodiments, a bounding shape can be a different shape than a rectangle. In some embodiments, a bounding shape can have, for example, an elliptical shape. In some embodiments, the techniques described in connection with FIG. 9 can be applied to a multi-dimensional data space and/or a gate boundary that includes more than two dimensions.

Figure 10A:
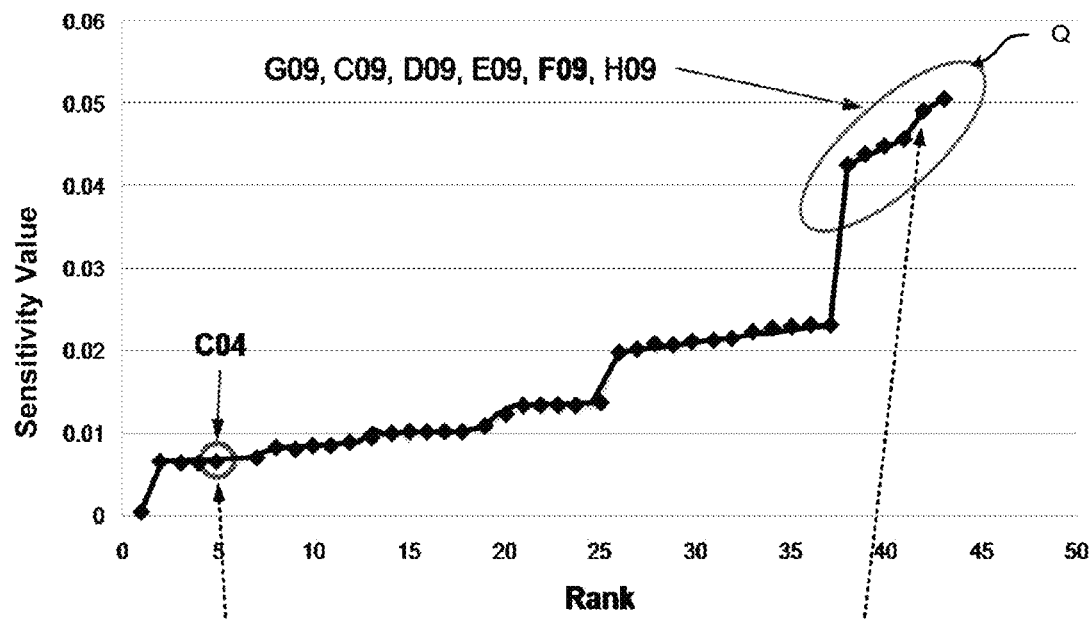
FIG. 10A is a schematic diagram that illustrates a plot of sensitivity values, according to an embodiment.
Figure 10B:
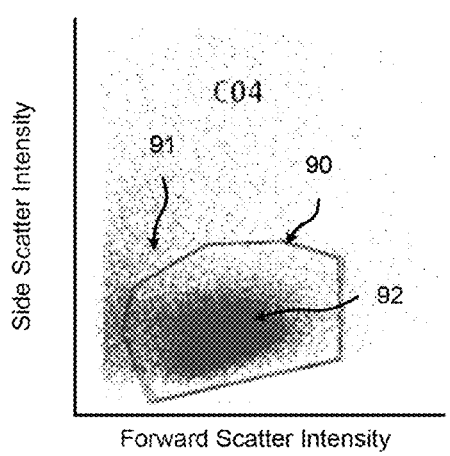
FIG. 10B is a schematic diagram that illustrates a set of gate boundaries within a data space that includes a dataset associated with a sample shown in FIG. 10A, according to an embodiment.
Figure 10C:
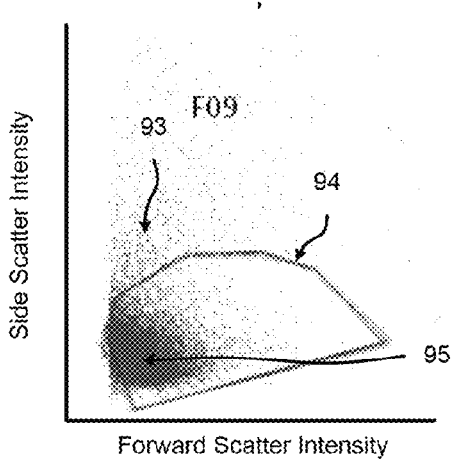
FIG. 10C is a schematic diagram that illustrates a set of gate boundaries within a data space that includes a dataset associated with another sample shown in FIG. 10A, according to an embodiment.

FIG. 10A is a schematic diagram that illustrates a plot of sensitivity values, according to an embodiment. FIG. 10B is a schematic diagram that illustrates a set of gate boundaries within a data space that includes a dataset associated with a sample shown in FIG. 10A, according to an embodiment. FIG. 10C is a schematic diagram that illustrates a set of gate boundaries within a data space that includes a dataset associated with another sample shown in FIG. 10A, according to an embodiment.

As shown in FIG. 10A, the sensitivity values are along a y-axis of the plot. In this embodiment, each of the sensitivity values is associated with a sample (e.g., a cell, a set of cells, a set of samples) that is ranked along the x-axis according to the sensitivity value. For example, as shown in FIG. 10A, the sensitivity value at rank 5 is associated with a sample (e.g., a cell, a set of samples, a well, a plate) labeled C04. The group of sensitivity values associated with rank 38 through rank 43 (identified at Q) are respectively associated with the samples labeled G09, C09, D09, E09, F09, and H09.

Each of the sensitivity values shown in FIG. 10A are derived from metrics calculated based on relationships between perturbed gate boundaries (which can include an initial gate boundary) and a dataset associated with the sample. In some embodiments, the sensitivity value can be a standard deviation of a set of metrics that are defined based on the relationships. For example, the sensitivity value associated with sample C04 (shown in FIG. 10A) can be defined based on a dataset and set of gate boundaries shown in FIG. 10B, and the sensitivity value associated with sample F09 (shown in FIG. 10A) can be defined based on a dataset and set of gate boundaries shown in FIG. 10C.

Specifically, as shown in FIG. 10B, a dense portion 92 of dataset 91 is relatively far from a perturbed vertex of a set of gate boundaries 90. Accordingly, the sensitivity value calculated based on the relationship between the dataset 91 and the set of gate boundaries 90 is relatively low as shown in the plot shown in FIG. 10A. In contrast, as shown in FIG. 10C, a dense portion 95 of dataset 93 is relatively close to a perturbed portion (e.g., a perturbed vertex, a perturbed line) of a set of gate boundaries 94. Accordingly, the sensitivity value calculated based on the relationship between the dataset 93 and the set of gate boundaries 94 is relatively high as shown in the plot shown in FIG. 10A. The relatively high sensitivity value associated with sample F09 compared with the relatively low sensitivity value of sample C04 can be an indicator that the set of gate boundaries 94 are positioned in a relatively unstable location.

In some embodiments, a sample (associated with the data shown in FIG. 10A) can be identified as being associated with a gate boundary in a relatively unstable location (e.g., in a high datapoint density location) based on a sensitivity value. For example, in some embodiments, a gating module can be configured to identify a sample from FIG. 10A as having a gate boundary in a relatively unstable location when a sensitivity value satisfies a condition (e.g., exceeds a threshold value). In some embodiments, gaps in sensitivity values, such as the sensitivity value gap between the sample with rank 37 and the sample with rank 38, can be identified by a gating module based on a condition. Thus, the gap can be automatically identified by a gating module.

In some embodiments, a template gate boundary, which can be defined based on a control dataset (e.g., a control dataset including actual measured data from a sample, a control dataset including simulated data), can be applied to datasets associated with multiple samples (e.g., biological samples, test substances). Sensitivity values can be calculated based on the application of the template gate boundary (and/or perturbations thereof) to datasets from the multiple samples. The relative or absolute variance in the sensitivity values can be used to determine a relationship between the template gate boundary and the datasets from the multiple samples.

In some embodiments, a sensitivity value calculated based on a relationship between the template gate boundary (and/or perturbations thereof) and a dataset associated with a sample can trigger an action when a condition is satisfied based on the sensitivity value. The action can include, for example, visual inspection of the sample or defining of a customized gate boundary for the dataset associated with the sample. In some embodiments, the techniques described in connection with FIG. 10A through 10C can be applied to a multi-dimensional data space and/or a gate boundary that includes more than two dimensions.

Although the plot of sensitivity values shown in FIG. 10A includes sensitivity values related to different initial gate boundaries, in some embodiments, a single gate boundary can be used to define such a plot. For example, an initial gate boundary can be perturbed with respect to datasets related to multiple samples. One or more sensitivity values (or other metrics) can be calculated for each sample from the multiple samples based on perturbations of the initial gate boundary with respect to the dataset related to each sample. The sensitivity values related to the multiple samples can be plotted in a fashion similar to that shown in FIG. 10A. The plot can be used to identify (based on a threshold condition) whether or not the initial gate boundary is a desirable gate boundary with respect to each sample. In some embodiments, one or more of the samples from the multiple samples can be a combination of samples.

Figure 11:
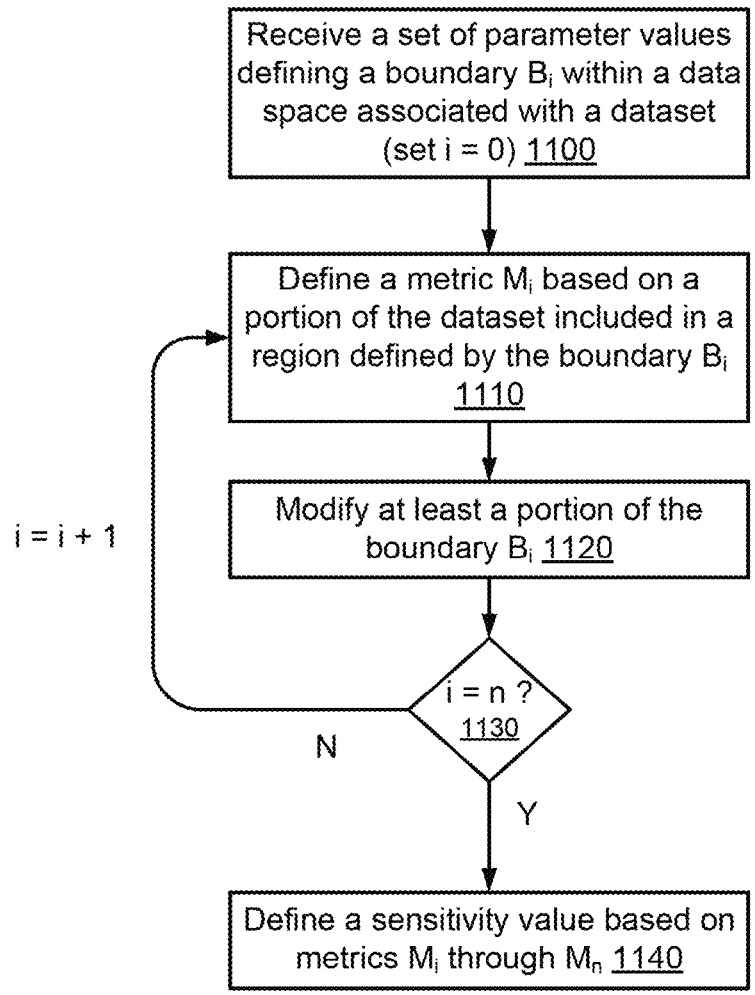
FIG. 11 is a flowchart that illustrates a method for calculating a metric and a sensitivity value, according to an embodiment.

FIG. 11 is a flowchart that illustrates a method for calculating a metric and a sensitivity value, according to an embodiment. As shown in FIG. 11, a set of parameter values defining a gate boundary $B_i$ within a data space associated with a dataset is received, at 1100. In this embodiment, the index value i is initialized to 0. In some embodiments, the index value i can be initialized to a different value. The gate boundary $B_i$ can be configured so that a portion of the dataset is disposed on one side of the gate boundary $B_i$ and another portion of the dataset is disposed on another side of the gate boundary B. In some embodiments, the data space can be a multi-dimensional data space that has, for example, more than two dimensions.

A metric $M_i$ is defined based on a portion of the dataset included in a region defined by the gate boundary $B_i$ at 1110. In some embodiments, the metric $M_i$ can be a percentage of a dataset included in the region. In some embodiments, the metric $M_i$ can be calculated based on a one or more portions of the dataset that are not included in the data space. For example, a portion of the dataset included in the data space can have dimensions (e.g., three-dimensions) that correspond with those of the gate boundary $B_i$. The metric $M_i$ can be calculated based on a dimension excluded from the data space (and excluded from the gate boundary $B_i$). More details related to a metric calculated based on a dimension excluded from a data space are described in connection with FIG. 11.

At least portion of the gate boundary $B_i$ is modified, at 1120. In other words, at least a portion of the gate boundary $B_i$ can be perturbed. In some embodiments, the gate boundary $B_i$ can be randomly or systematically modified. In some embodiments, a portion of the gate boundary can be scaled and/or a vertex of the gate boundary $B_i$ can be modified.

If the index value i is not equal to a value n, at 1130, the index value i is incremented. In some embodiments, the index value i can be incremented by more or less than one. The value n can be defined based on a user preference. In some embodiments, the value can be a specified number of perturbations of the gate boundary.

In some alternative embodiments, the number of perturbations of a gate boundary can be determined based on, for example, a condition being satisfied. For example, if gate boundary $B_i$, when compared with other gate boundaries already included in a set of gate boundaries, has a Tanimoto coefficient (or Tanimoto distance), that satisfies a threshold condition, further perturbations of the gate boundary can be ceased.

If the index value i is equal to a value n, at 1130, a sensitivity value is defined based on metrics $M_i$ through $M_n$, at 1140. The sensitivity value can be a standard deviation value calculated based on, for example, at least a portion of the metrics $M_i$ through $M_n$. The sensitivity value can be, for example, a coefficient of variation calculated based on at least a portion of the metrics $M_i$ through $M_n$.

Figure 12:
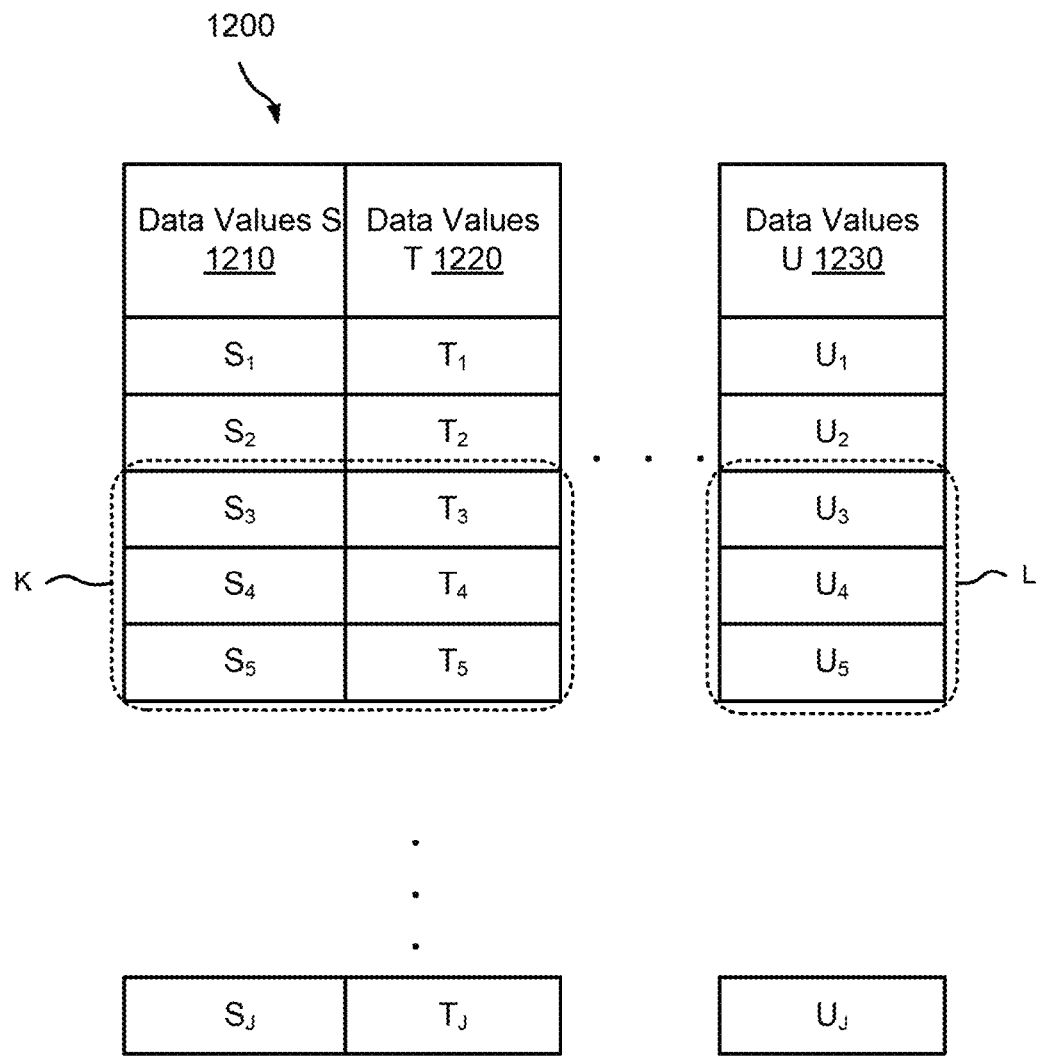
FIG. 12 is a schematic diagram that illustrates a table including data values from a dataset, according to an embodiment.

FIG. 12 is schematic diagram that illustrates a table 1200 including data values from a dataset, according to an embodiment. As shown in FIG. 12, the dataset includes at least data values S (shown in column 1210), data values T (shown in column 1220), and data values U (shown in column 1230). As shown in FIG. 12, the data values S include data value $S_1$ through data value $S_J$, the data values T include data value $T_1$ through data value $T_J$, and the data values U include data value $U_1$ through data value $U_J$.

In some embodiments, a gate boundary can be defined with respect to a portion of the dataset and a metric can be defined with respect to a different portion of the dataset. For example, a gate boundary can be defined so that a portion of the data values S and data values T that are included in the dashed line K are included within the gate boundary. A metric can be calculated based on a portion of the data values U (included in the dashed line L), which correspond with the data values included in the dashed line K. In this embodiment, the gate boundary is defined with respect to a portion of the dataset that is mutually exclusive from a portion of the dataset that is used to define the metric. In other words, the metric is defined based on an ungated portion of the dataset. Also, as shown in FIG. 12, the gated boundary is related to two dimensions of the dataset (the dimensions related to data value S and data values T) that are different than the dimension of the dataset (the dimension related to data values U) used to define the metric.

In some embodiments, multiple gate boundaries can be perturbed within a data space including a dataset, and their combined influence on an ungated portion of the dataset can be determined. In some embodiments, the gate boundaries can be perturbed within portions of a dataset that have overlapping or non-overlapping dimensions. For example, a first gate boundary can be perturbed with respect to data values from a first set of dimensions of a dataset, and a second gate boundary a gate boundary can be synchronously (or asynchronously) perturbed with respect to data values from a second set of dimensions of the dataset. A metric can be calculated based on data values from a third dimension of the dataset. In some embodiments, any two of the first dimension of the dataset, the second dimension of the dataset, and the third dimension of the dataset can be overlapping or mutually exclusive. In some embodiments, a gate boundary can be defined with respect to a first portion of the dataset and a metric can be defined with respect to a second portion of the dataset that overlaps with the first portion of the dataset. In some embodiments, the method described in connection with FIG. 13 can be applied to a multi-dimensional data space and/or a gate boundary that includes more than two dimensions.

Figure 13:
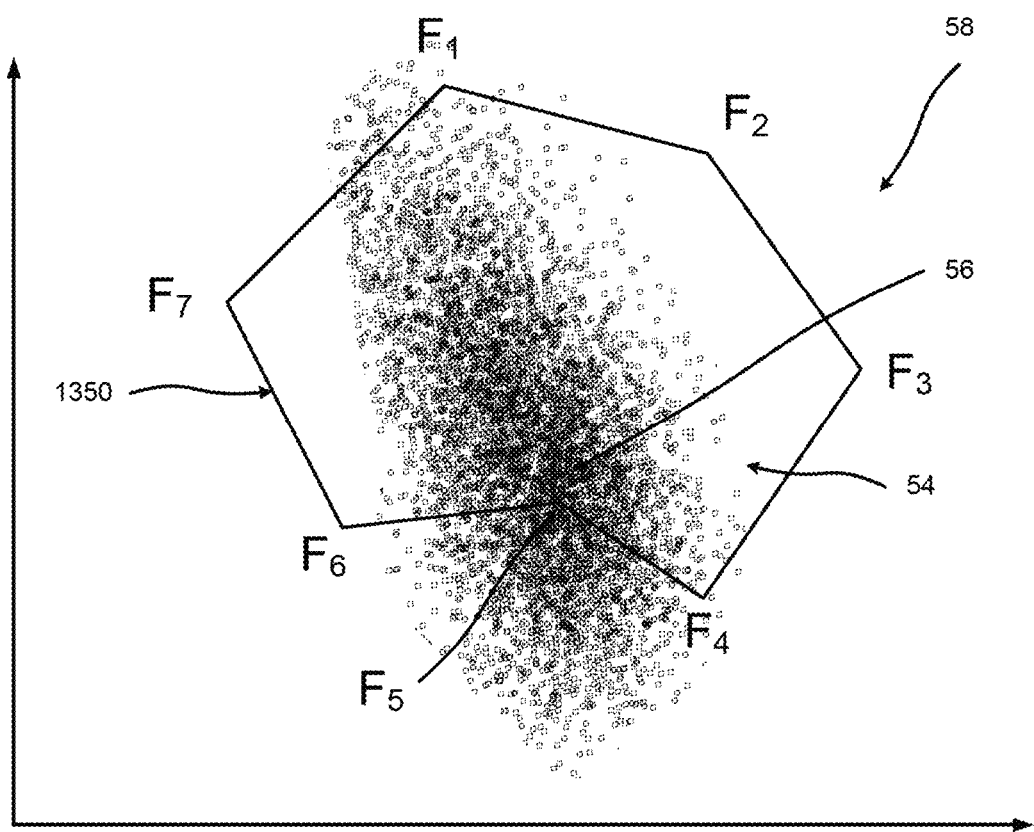
FIG. 13 is a schematic diagram that illustrates a gate boundary used to discover a characteristic of a dataset, according to an embodiment.

FIG. 13 is a schematic diagram that illustrates a gate boundary 1350 used to discover a characteristic of a dataset 54, according to an embodiment. As shown in FIG. 13, the gate boundary 1350 is included in a two-dimensional data space 58. As shown in FIG. 13, the gate boundary includes vertices $F_1$ through $F_7$ and has line segments between the vertices.

In some embodiments, a characteristic of the dataset 54 can be determined based on one or more metrics, such as sensitivity values, calculated based on independent perturbations of each of the vertices. In some embodiments, the vertices can be systematically selected (e.g., selected in a round-robin fashion) for perturbation or each of the vertices can be randomly selected for perturbation.

For example, a first sensitivity value can be calculated based on perturbations of vertex $F_4$ at a specified magnitude without perturbing any of the other vertices (i.e., vertices $F_1$-$F_3$ and vertices $F_5$-$F_7$), and a second sensitivity value can calculated based on perturbations of vertex $F_5$ at the specified magnitude without perturbing any of the other vertices (i.e., vertices $F_1$-$F_4$ and vertices $F_6$-$F_7$). The sensitivity value calculated based on the perturbations of vertex $F_5$ will be higher than the sensitivity value calculated based on the perturbations of vertex $F_4$ because the vertex $F_5$ is located in a relatively high density portion 56 of the dataset 54 compared with the location of the vertex $F_4$ within dataset 54. Accordingly, the relatively high density portion 56 of the dataset 54 can be identified based on a comparison of the sensitivity value calculated based on the perturbations of vertex $F_5$ and the sensitivity value calculated based on the perturbations of vertex $F_4$.

In some embodiments, after the high density portion 56 has been discovered, a new gate boundary (not shown) can be defined around the high density portion 56. In some embodiments, the new gate boundary (which can be more focused (or less focused) on the high density portion 56 than the gate boundary 1350) can be automatically (or manually) defined based on the metrics used to discover the high density portion 56. One or more metrics can be calculated based on perturbations of the new gate boundary so that the high density portion 56 can be further analyzed. In some embodiments, the techniques described above can be applied to other areas of interest within a dataset and/or to other characteristics of a dataset (in addition to, or in lieu of, high density portions of a dataset).

In some embodiments, a characteristic of the dataset 54 can be determined based on one or more metrics (e.g., Tanimoto distances) calculated based on perturbations of different portions of the gate boundary 1350. For example, a characteristic of the dataset 54 can be determined using one or more metrics calculated based on perturbations of different portions of the gate boundary 1350 such as combinations of vertices and/or line segments between the vertices. In some embodiments, the techniques described in connection with FIG. 13 can be applied to a multi-dimensional data space and/or a gate boundary that includes more than two dimensions.

Although not shown, in some embodiments, one or more characteristic of a dataset (such as dataset 54) can be discovered by perturbing multiple gates within a data space that includes the dataset. For example, multiple initial gates can be defined within a data space that includes the dataset. The multiple initial gates can be arranged in a layout (e.g., in an non-overlapping layout, in an overlapping layout) such as a grid pattern within the data space, a random distribution within the data space, and/or so forth. A set of metrics (e.g., a set of a sensitivity values) can be defined based on perturbations of each of the multiple initial gates. The set of metrics can be analyzed to discover, for example, a characteristic related to the dataset such as an area of high density datapoints within the dataset.

In some embodiments, automated gating can be used. Automated gating refers to a set of computational methods that, in combination, are able to determine cell population subsets based on certain cell characteristics and enable a user (e.g., scientist) to define, modify and/or correct these subsets.

Automated gating can include multiple modules for an overall process and analysis method. One embodiment includes a method for automatically gating the results of a biological process for determining the activation level of activatable elements, such as shown in the patents and applications incorporated herein. See for example U.S. Pat. Nos. 8,273,544 and 8,187,885. In some embodiments, automated gating can include gating sensitivity, as described in U.S. Ser. No. 12/501,295 for example, along with modules for other operations. In one embodiment, automated gating can include a method for generating boundaries to separate regions. In another embodiment automated gating can be a system to maintain a database of user-provided cell population definitions and associate these definitions with wells, an automated way to build cell populations, acquire data, and associate data with wells. See U.S. Ser. No. 12/501,274. In another embodiment, automated gating can include a method to perform statistical analysis on gating data from multiple wells to identify outliers to be reviewed by a flow cytometry expert. Automated gating can provide a more consistent gating result in a more efficient manner in lieu of manual gating. In another embodiment, automated gating can include a visualization of the generated boundaries for different populations allowing a user to adjust the region boundaries defined by the algorithm. A researcher will be able to more quickly focus on relevant cell populations and the relevant biological readout in each population.

A scheme includes one or more populations; each population having one or more regions. A region can participate in multiple populations. An example of such scheme is described in FIGS. 6 and 7. One embodiment involves defining the logic to describe a population, having one or more regions, encoding the result in a computer readable and storable format, retrieving the stored data, associating the scheme (which are a group of populations that go together) with a particular sample (possibly in a test well), transforming the population definitions into a logical expression, and applying the logical expression to identify the cells in each population.

In another embodiment automated gating can involve automatically deriving the population hierarchy (e.g., lineage) from the stored population definitions.

A region includes geometric boundaries defined on an input set of cells and a combination of various cell characteristics. There are many methods for determining geometric boundaries. Boundaries can be cutpoints or thresholds in one or more dimensions. Boundaries can be shapes or volumes in two or more dimensions. These boundaries may be defined within a limited search space. The input set of cells can be but are not restricted to all events observed in a given well, certain subsets (populations) of the events in a given well, etc. The cell characteristics along which the geometric object is defined can include but is not restricted to scatter patterns (side and forward scatter), the expression of one, two or more surface markers, intracellular proteins or changes in intracellular protein expression, or combinations thereof. Some examples of regions (R1, R2, etc) can be found in FIG. 5. Examples of intracellular markers are found in the patents and applications listed above and incorporated herein by reference. For hematological pre-pathological and pathological conditions the cell surface markers of interest that may be used in some embodiments include CD2, CD3, CD4, CD5, CD7, CD9, CD10, CD11, CD11b, CD13, CD14, CD15, CD15, CD19, CD20, CD21, CD22, CD23, CD24, CD31, CD33, CD34, CD36, CD37, CD38, CD39, CD40, CD43, CD44, CD45, cCD45, CD48, CD54, CD56, CD61, CD64, CD65, CD70, CD79b, CD81, CD87, CD116, CD117, CD133, CD135, CD235a, Integrinβ7, CXCR5, LAIR-1, CCR6, kappa light chain, lambda light chain, HLA-DR, MPO, LF, and TdT, and combinations thereof. A non-limiting list of cells that are defined by other surface markers includes cells that have CD45, EpCam, or cytokeratin (cells that are CD45−/cytokeratin+/EpCam+ are epithelial cells), "stem cell populations" which include CD34+CD38− or CD34+CD33− expressing cells; drug transporter positive cells; i.e. C-KIT+ (SCF Receptor, CD117) cells+; FLT3+ cells; CD44+ cells, CD47+ cells, CD123+ cells, or multiple leukemic subpopulations based on CD33, CD45, HLA-DR, CD11b; memory CD4 T lymphocytes; e.g., CD4+CD45RA+CD29 low cells; or multiple leukemic sub-clones based on CD33, CD45, FILA-DR, CD11b; regulatory CD4 T lymphocytes; e.g. CD4+CD25+Foxp3+ cells; or multiple leukemic sub-clones based on CD33, CD45, HLA-DR. Also, signaling comparisons can be made between closely related cell subsets, for example: conventional helper T cells (CD4+FoxP3−) that express intracellular/extracellular CTLA-4, conventional helper T cells that do not express CTLA-4, and regulatory T cells. For example, B cells can be further subdivided based on the expression of cell surface markers such as CD19, CD20, CD22, CD27, CD38, CD95, and IgD. Other surface markers can be found in the references incorporated herein above.

In one embodiment, different regions can be defined in one or more dimensions and different populations can be defined in another. These regions when used in combinations that can be expressed mathematically can define a population of cells. The resulting method can be applied to data obtained from a flow cytometer or mass spectrometer, for example, to identify or define cells in each population. For information on mass spectrometers see Tanner et al. Spectrochimica Acta Part B: Atomic Spectroscopy, 2007 March; 62(3):188-195. See also, U.S. Patent Publications 2012/0056086, 2011/0253888, 2009/0134326, and 2011/0024615 which are incorporated herein by reference in their entireties. For information on flow cytometers, see the references cited above.

Other automated methods allow for the separation of peaks into different cell populations. For example, data can be presented in a bimodal or multimodal distribution along one or more characteristics/parameters such as scatter or surface markers. Instead of manually drawing the boundary between different cell populations an algorithm can be used to define the boundary in that parameter space. Once an initial boundary is defined, an adjustment can be made to the boundary using a gating sensitivity algorithm or any other method for further refinement, or based on prior information such as biological knowledge. Also, another method to refine boundaries involves using a contour of cell event density (e.g., move toward valleys/lower density cut points). An example of biological knowledge may be in the form of specifying that the boundary not be in the valley but either biased to varying degrees (the degree may be user specified or automatically determined by various analytical or numerical optimization methods) towards the lower intensity cells of a bimodal distribution (bias low) or higher intensity cells of that distribution (bias high). Bias can be applied in one or more dimensions corresponding to one or more cell characteristics.

Another embodiment involves identifying and tagging boundaries that may have a higher likelihood of being incorrect as judged by a trained scientist. These tags can be persisted in a database and used to prioritize the order in which gates are reviewed by a scientist so that modifications or corrections can be applied. A boundary can be tagged or flagged if it violates a set of heuristic rules based on prior biological knowledge or is deemed an outlier using statistical analysis (described in detail below). Examples of prior biological knowledge can be but is not limited to expected intensities values of the cutpoint, expected events in a given boundary, etc.

In another embodiment, statistical analysis on the locations of cut-points drawn by automated gating across multiple wells can be performed. Such analysis will allow the method to identify cut-points that are inconsistent (outliers) in a collection of wells. These wells can be prioritized for review by an expert. In another embodiment, the sensitivity of cell populations (as a distinct procedure from gating sensitivity described earlier) to changes to cut-points (or geometry) of an individual region can be computed. The unique logical combination of regions for a cell population may either make a population less or more sensitive to a specific region. Analyzing this pattern of sensitivity can allow for a user (scientist) to focus on reviewing regions of high sensitivity.

In another embodiment, the automatic gating software can "learn" by tracking and mining user input into changes or rules for the software. The automated gating software can follow and incorporate user preferences, much like current browser technology. For example, the automated gating software can automatically identify biases in changes to boundaries and utilizes this user behavior information to refine (improve) automatic region definitions. In another embodiment, the automated gating software can learn user preferences of boundary by mining changes made by users to the boundaries. This learning can be conditioned on additional information such as cocktail, modulator, and/or inhibitor used. An example is CALO, cognitive assistant that learns and organizes, similar to SIRI from Apple iOS. See also U.S. Publication No. 2002/0078056, and Eliassi-Rad and Shavlik, User Modeling and User-Adapted Interaction 13: 35-88, 2003. This feature is called "user modeling" and it is a subdivision of human-computer interaction which describes the process of building up and modifying a user model. The main goal of user modeling is customization and adaptation of systems to the user's specific needs. In one embodiment, when a specific user encounters a given material, reagent, or set of conditions, then a rule for adjustment can be put into place for customized gating. In another embodiment, the rules may be applied globally for all users with or without regard for the context of material, reagent, set of conditions, etc.

In one embodiment, the examples of algorithms include k-means clustering, Gaussian mixture models, peak finder, mean shift, and thresholding at a percentage of events or density, potentially on two or higher dimension grid.

In another embodiment, regions and population definitions can be drawn and visualized and a user can be allowed to adjust region thresholds/cut points (SCNPviz). For example, method system may have user Interface elements with pre-specified (stored) layouts and may be integrated with a database that stores metadata associated with wells and region and population definitions. Examples of databases and systems are shown in U.S. Ser. Nos. 12/538,643 and 12/501,274. The systems can be integrated with embodiments described above to allow a user to modify regions drawn with the algorithm, for example, to adjust the boundaries of regions in which the boundary drawing algorithm had low confidence. When a user adjusts one region boundary the system will re-compute dependent region boundaries and statistics associated with populations. The system allows for downstream recalculation after subsequent changes to the initial populations including but not limited to reapplication of the boundary drawing algorithm with the altered populations. This system enables automated capture of user adjustments that may be used for input to the embodiment which derives rules or biases from observing user input. The system also allows for interactive real time updating of the display. One embodiment of the system will track changes users make to given region boundaries to show a "before and after" view with and without the changes.

Figure 14:
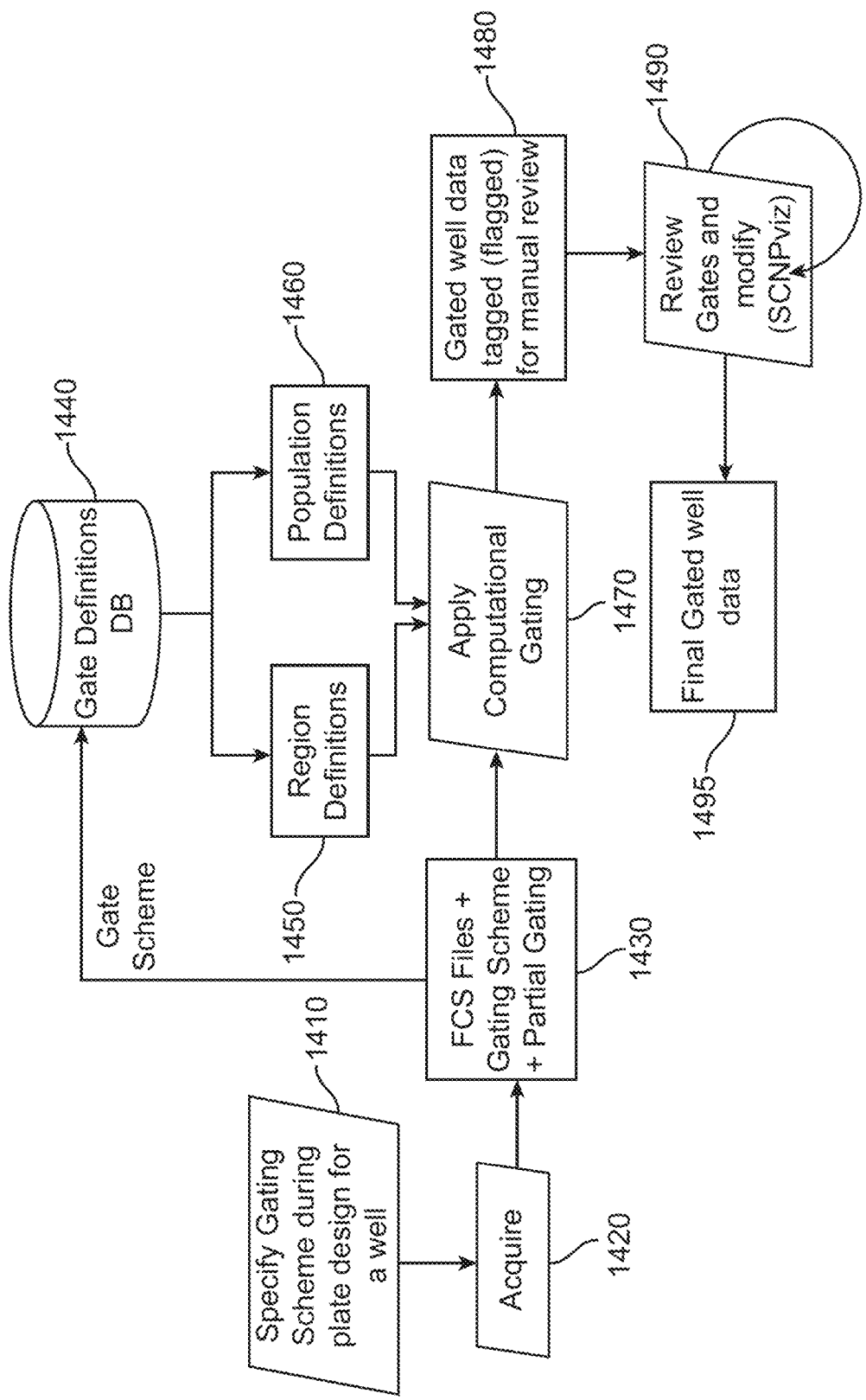
FIG. 14 is a flowchart of an automated gating process, according to an embodiment.

FIG. 14 shows an outline of the overall gating process. At the beginning of the experiment, a user, who can be a researcher or scientist, will specify a gating scheme during the plate design for a well 1410. The gating scheme can include two parts, region definitions (FIG. 19) and population definitions (FIG. 7). Then, the samples are prepared by processes described in the patents and patent applications incorporated above, such as U.S. Pat. Nos. 8,273,544 and 8,227,202. In sum, cells may be thawed and placed in wells with modulators, then fixed, permeabilized and stained. Data can be acquired 1420 when the cells are analyzed using a flow cytometer, for example. In some embodiment, the data can be outputted as FCS files. Additionally, a gating scheme, and in some instances specific regions, can be defined by the researchers (partial gating). The gating scheme and pre-defined regions (partial gating) 1430 can be stored in a database 1440. Region 1450 and population definitions 1460 can be derived in specific formats (FIGS. 19 and 20) and used as input to a computer code that defines the populations and regions in the two files computationally 1470 and produces tags for potentially incorrect regions 1480. The results can then be displayed to the user via tight integration with SCNPviz 1490. SCNPviz is the visualization front end that researchers use to interact with the results generated from automated gating process. A researcher may look at the computational regions in certain order (ex: tagged regions first) and review some or all of the regions 1495. (Get some more info on SCNPViz from Greg)

Figure 15:
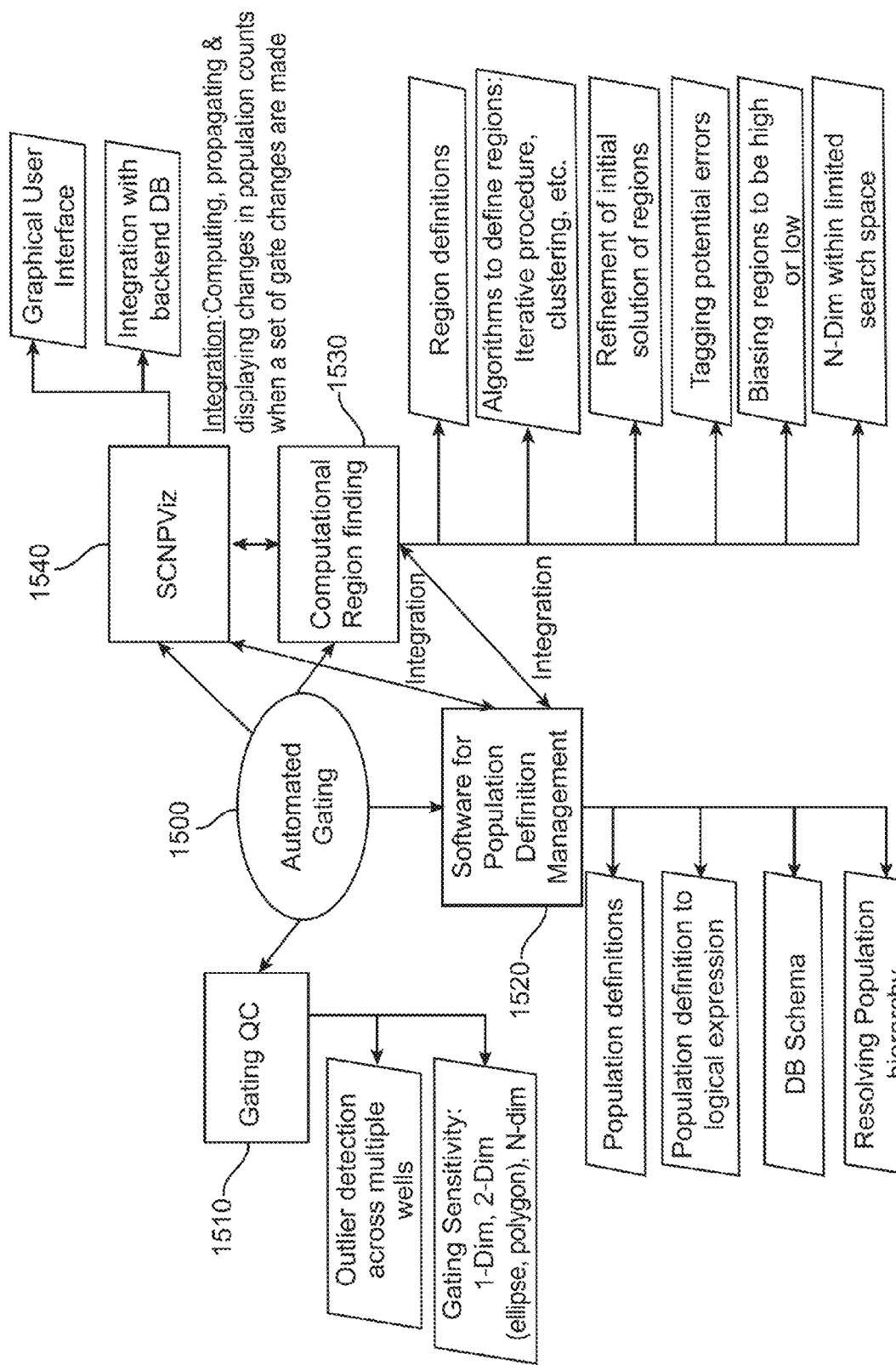
FIG. 15 illustrates components of an automated gating process, according to an embodiment.

FIG. 15 shows components used in an automated gating 1500 process, according to an embodiment. The subcomponents of automated gating can be gating quality control 1510, software for population definition management 1520, computational region finding 1530, and an interactive visualization front 'SCNPviz' 1540. Gating assessment contains outlier detection across multiple wells and gating sensitivity, such as, for example, one, two and N dimensions using ellipses, polygons, etc. Software for population definition management contains population definitions, population definitions to logical expression, Data base schema, and resolving population hierarchy. Computational region finding contains researcher supplied region and population definitions, algorithms to define regions, iterative procedure to generate all regions and populations, refinement of initial solution of regions, tagging regions that have potential errors, biasing regions to be high or low, and n-Dim (n-dimensions) within limited search space. SCNPviz includes a graphical user interface and integration with the backend database.

Figure 16:
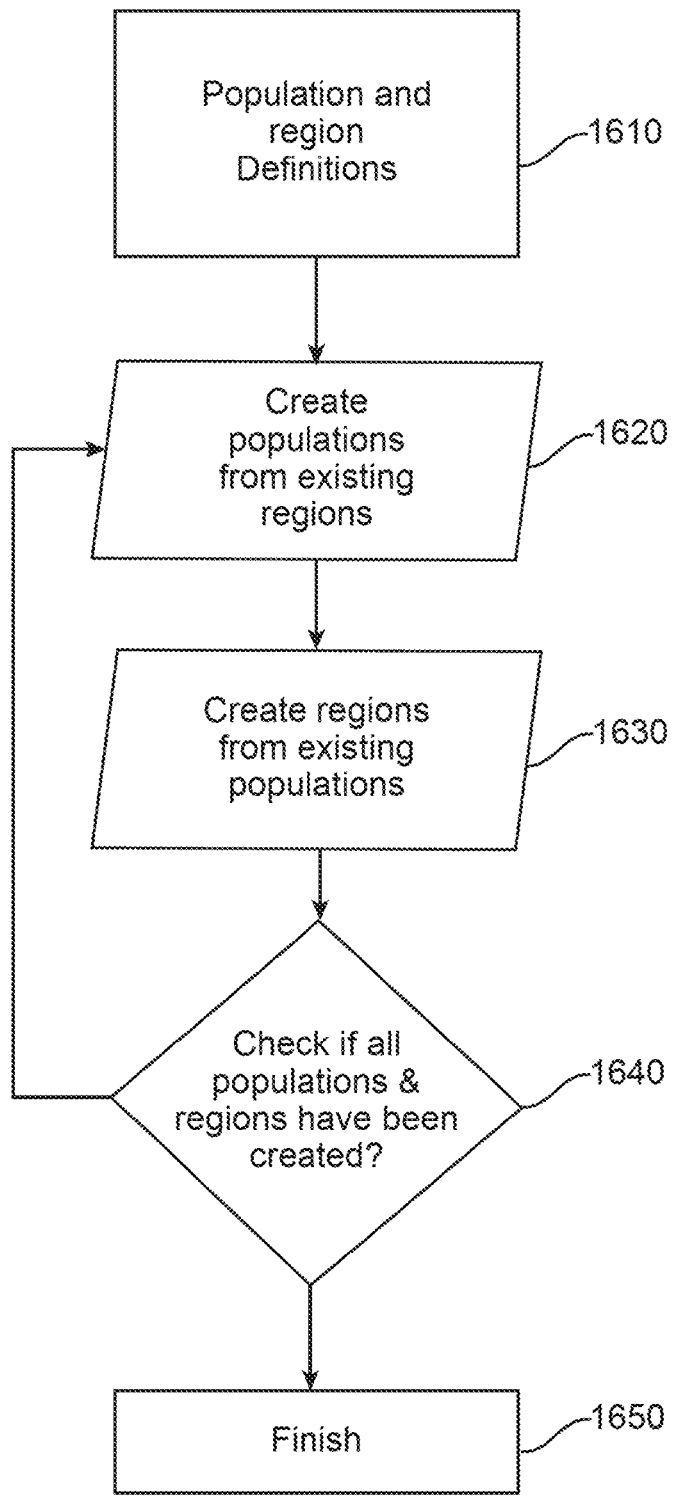
FIG. 16 is a flow chart illustrating an iterative process of defining populations and regions, according to an embodiment.

As explained above, the automated gating process can be iterative to create and/or create and/or define populations and regions. FIG. 16 shows that the process involves definition populations and regions 1610, inputting data and creating and/or defining populations from existing regions 1620 and creating and/or defining regions from existing populations 1630. There is a check step to ensure that the populations and regions have been created and/or defined 1640 and if not, then the process restarts. If all populations and regions have been created and/or defined, then the process is finished 1650.

Figure 17A:
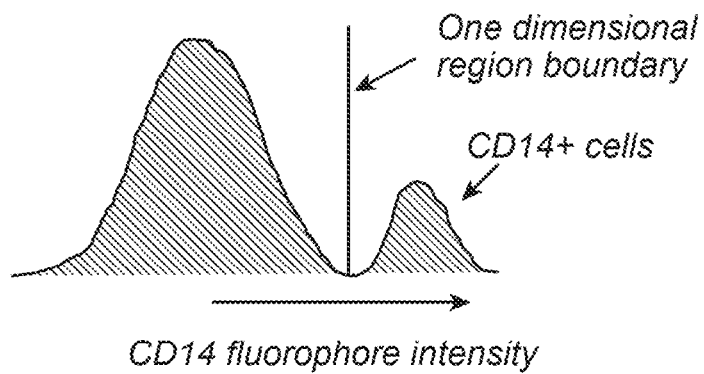
FIGS. 17A-17C illustrate defining different regions using a bias, according to an embodiment
Figure 17B:
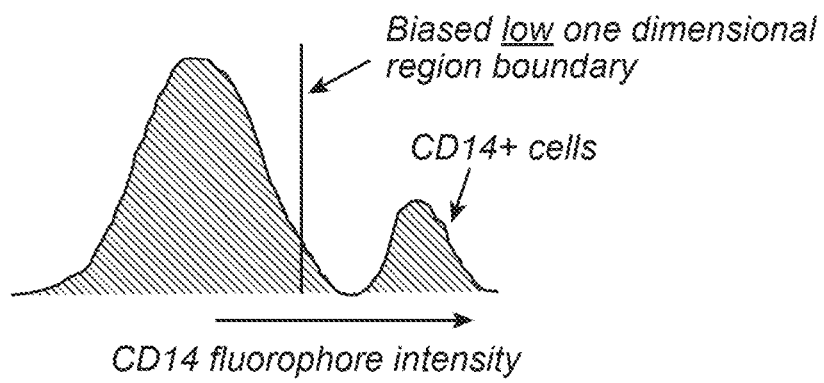
Figure 17C:
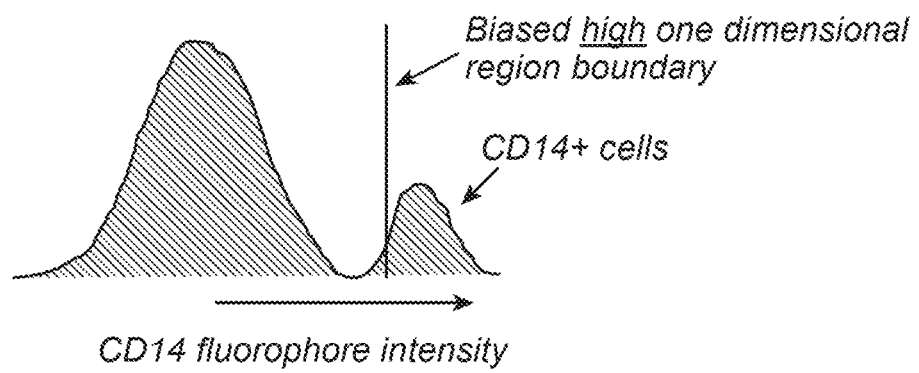

FIGS. 17A-17C show the application of user preferences or bias to a gating scheme. FIGS. 17A-17C show a bimodal distribution of data into regions. FIG. 17A shows a one dimensional regional boundary between the two peaks. FIG. 17B shows that the regional boundary has been shifted or biased to a low point on the plot and FIG. 17C shows a shift in the one dimensional regional boundary to the high end of the plot. Bias high or low can be used, but is not limited to, eliminating certain cells that may not show a clear expression intensity of a set of markers is either positive or negative side of the expression range. In one embodiment, biasing can be used to ensure that a population or region is "pure" with respect to other, proximate regions or populations.

Figure 18:
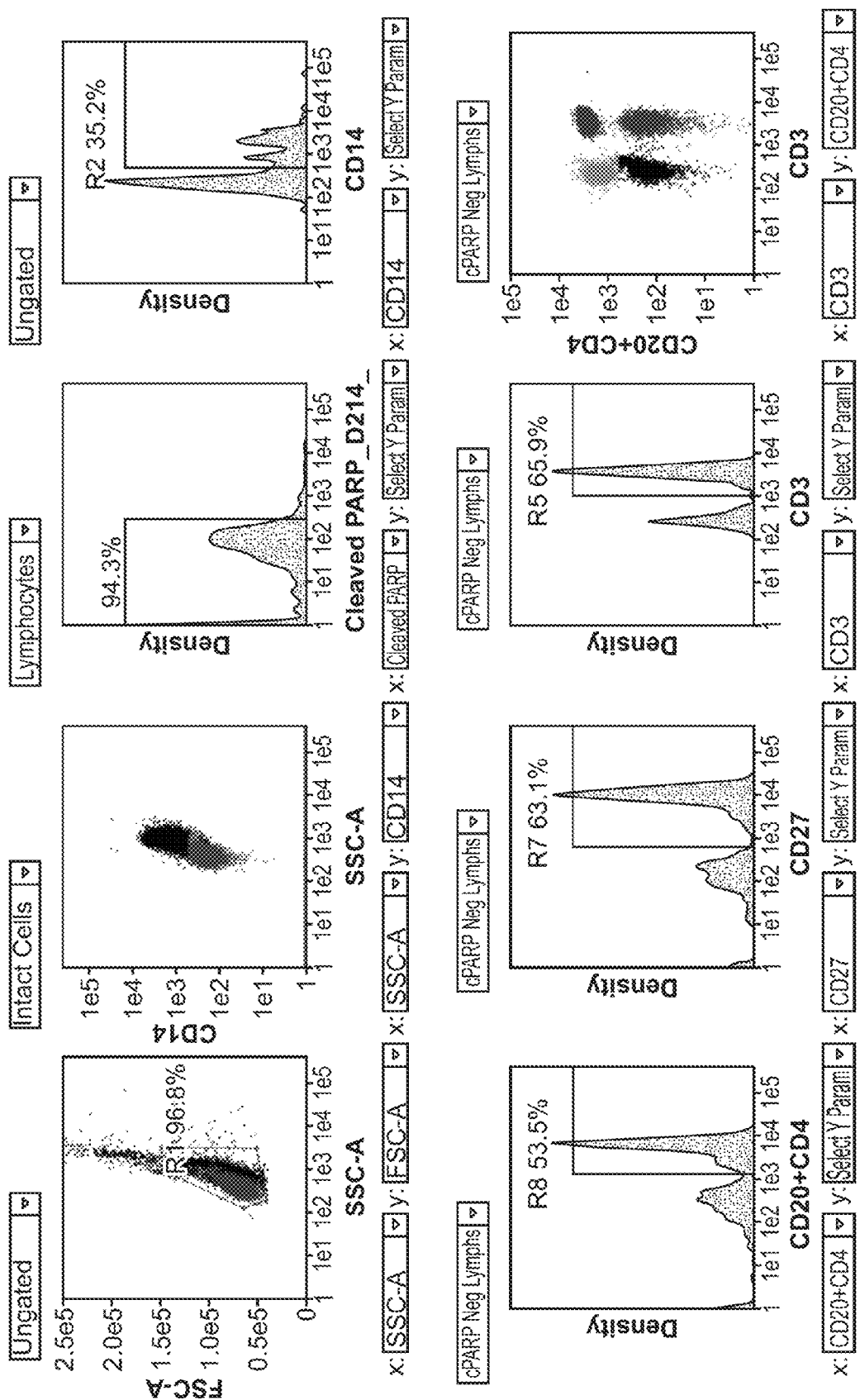
FIG. 18 illustrates plots of various regions and populations from a gating scheme, according to an embodiment.

FIG. 18 shows one embodiment of the current process in which plots are shown of various regions and populations from a gating scheme and plotted on SCNPviz. Components of automated gating are integrated and FIG. 18 shows the power of this integration. A researcher can change one or more regions simultaneously or separately. The results of such changes in terms of counts and intensity distribution of cells in various populations can be substantially immediately displayed to the user dynamically. This provides substantially immediate feedback to researchers of the effect of moving/changing region boundaries.

FIG. 19 shows an example of researcher specified region definitions used in the automated gating process. The information is provided in a matrix format. The columns describe the various pieces of information used to computationally define a region. The first column is the name of the region. Second column 'Marker Name' contains one or more markers on which the region is specified. Third column /Input Population Name' describes the cell subset (population) that can be used along with the marker intensities of these cells to define the region. Each region partitions the space into two parts. 'Region Location' is the column where a researcher can specify to which part the region actually corresponds. 'Expected Range' is the column where the scientist inputs his or her estimate of where the region might belong. Such an estimate can be a range for a cut-point or set of ranges for multi-dimensional regions such as polygons. A column 'Bias' is used to capture any bias related input from the researchers. The last column is 'Other' that can specify other biological knowledge in a free text format for a specific experiment or study. This can be primarily used by computational scientist to understand and then code special biological knowledge into the automated gating process on a per experiment or study basis.

Figure 20:
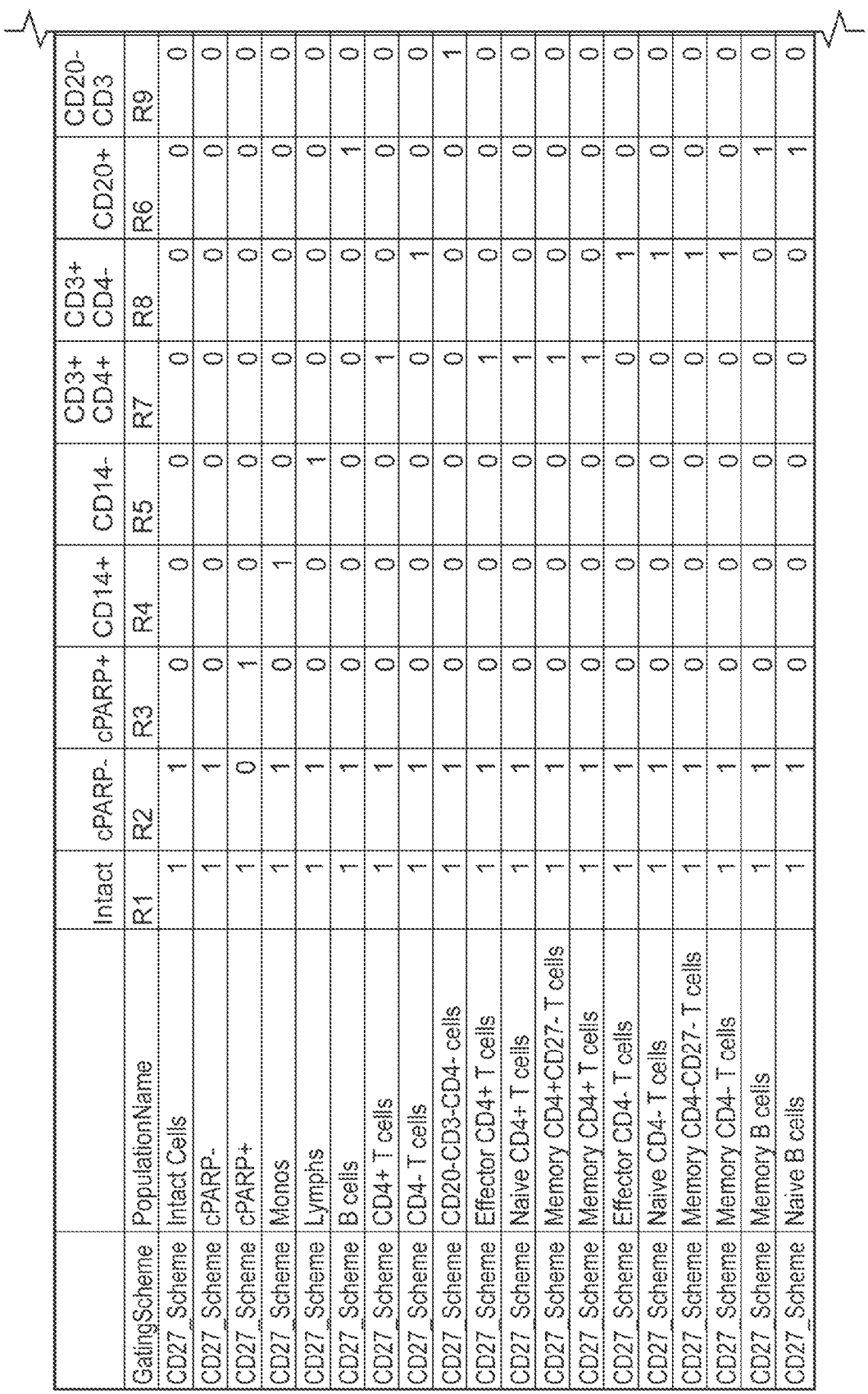
FIG. 20 illustrates an example of researcher specified population definitions used in an automated gating process, according to an embodiment.

FIG. 20 shows an example of researcher specified population definitions used in the automated gating process. The information can be provided in a matrix format. First row is reserved for user defined region names (ex: cPARP+) and the first column has population names. Subsequent columns contain region identifiers (ex: R1, R2, etc). A '1' in a cell of the matrix implies that the region in that column contributes to the logical expression defining the population in that row. A '–1' implies that logical 'NOT' of the region in the column contributes to the logical expression defining the population in that row. A '0' implies that the region in the column does not contribute to the population in that row.

Figure 21:
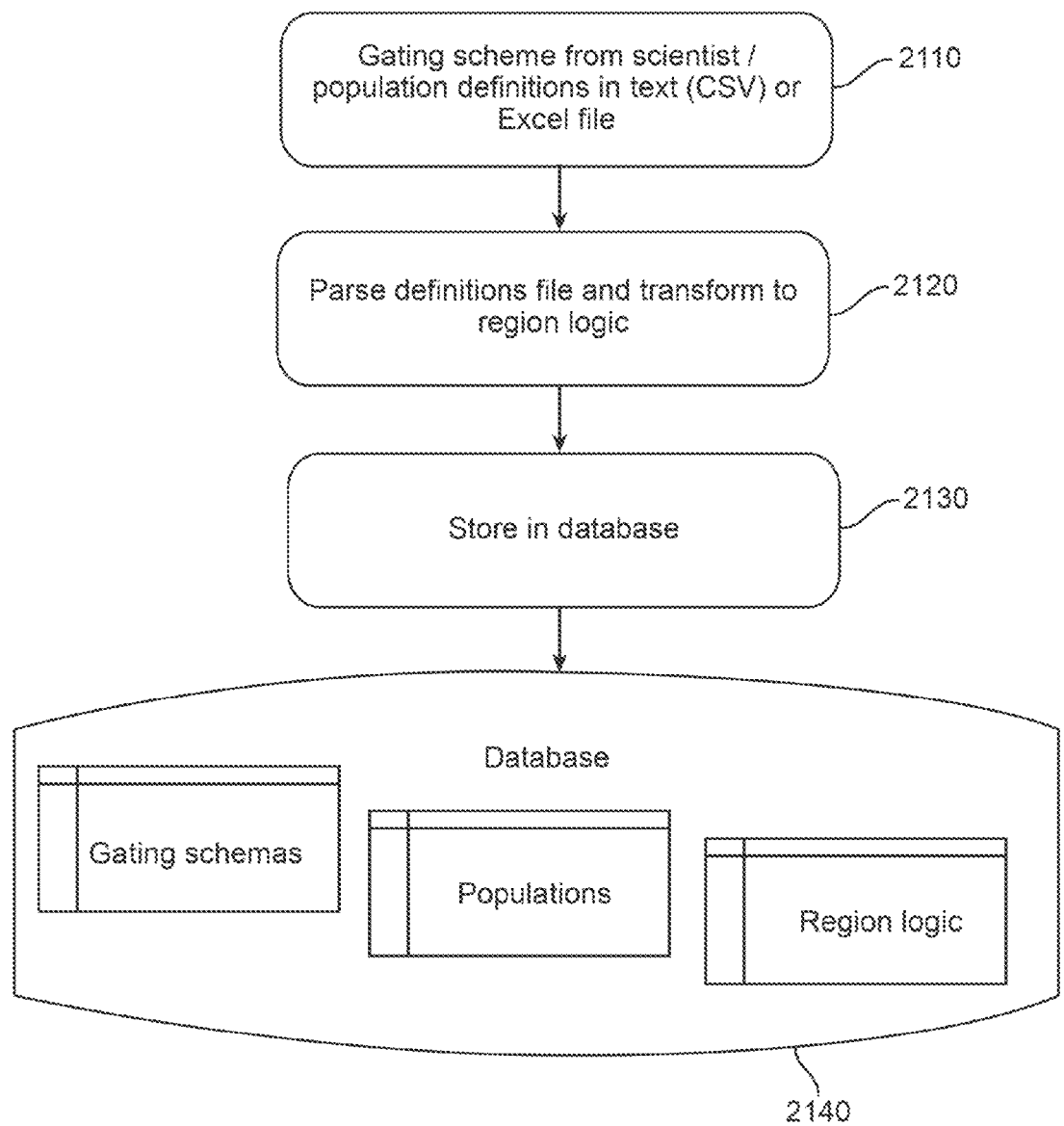
FIG. 21 illustrates a process for defining a database, according to an embodiment.

FIG. 21 shows a process for obtaining the software for population definition management. For example, a gating scheme from a scientist is provided for population definitions in text (CSV, comma separated value) or an Excel file 2110. Then, the definitions file can be parsed and transformed to region logic 2120. The results can be stored in a database at 2130. The database 2140 can include gating schemas, populations or region logic.

Figure 22:
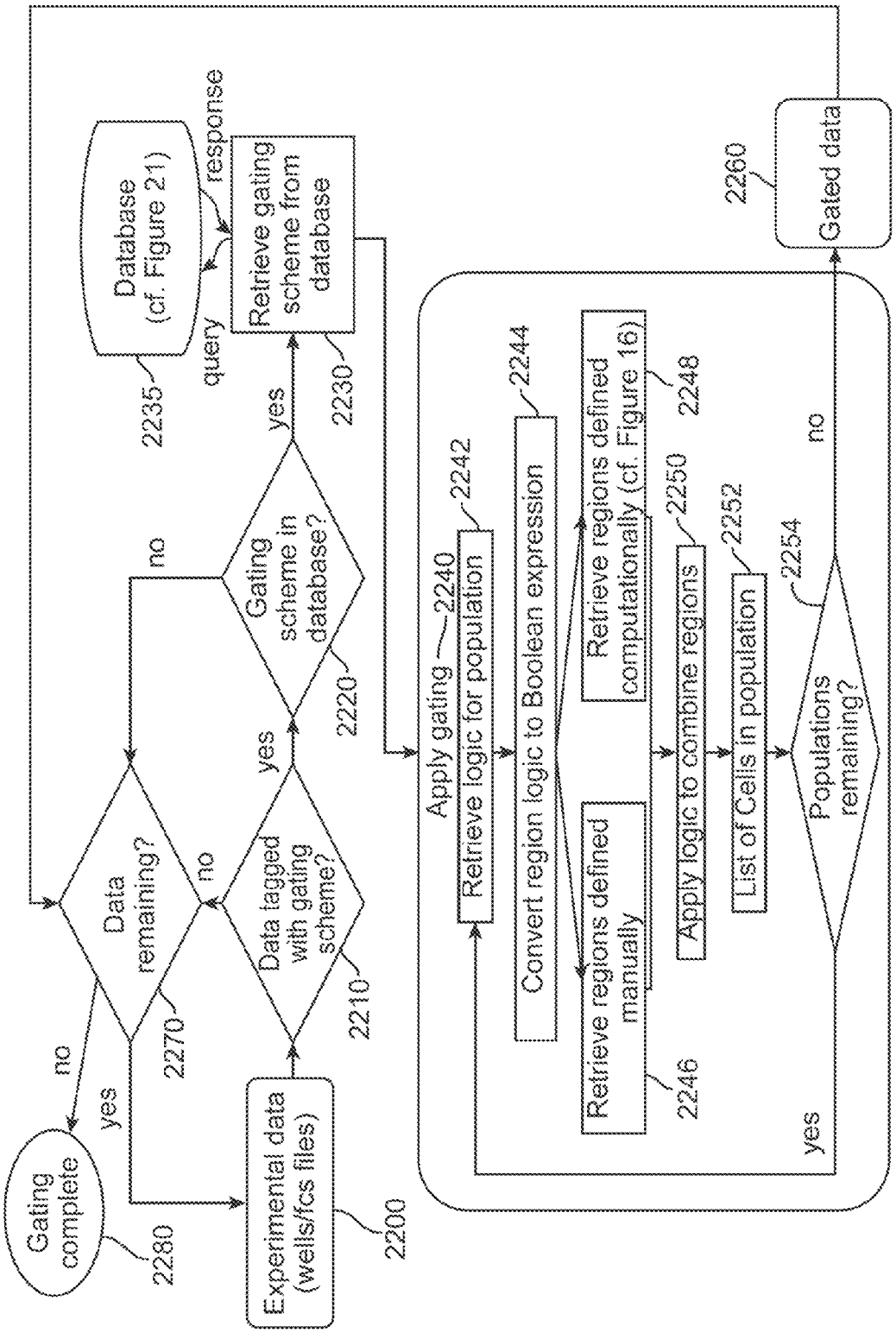
FIG. 22 is a flow chart illustrating an automated gating process, according to an embodiment.

FIG. 22 illustrates another embodiment of automated gating. Data is input at step 2200. The process determines if the experimental data is tagged with a gating scheme 2210. If yes, then the process determines if the gating scheme is in the database 2220. If no, then the process determines if there is data remaining and recycles back to step 2200. The process proceeds from step 2220 to retrieve gating scheme from the database 2235 using a query and response. Otherwise, it recycles back to step 2200. Once the experimental files are matched with the scheme and the database, the software gates the data 2240. The information from step 2230 is gated by retrieving the logic for the population 2242, converting the region logic to Boolean expression 2244 and then retrieving regions that have been manually defined 2246 or computationally defined 2248. Then, logic is applied to the combined regions 2250 to obtain a list of cells in the population 2252. The process determines if there are populations remaining to be analyzed 2254 and if so the process returns to step 2242. If not, then gated data is obtained 2260 and the process determines if there is any data remaining 2270. If none remaining, then the gating is complete 2280.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

In some embodiments, an experiment management engine and/or any portion of the embodiments described herein can be executed at (e.g., implemented on) a computer. In some embodiments, a computer can be used by to operate various instrumentation, liquid handling equipment and/or analysis software. The computer can have any type of computer platform such as a workstation, a wireless device, a wired device, a mobile device (e.g., a PDA), a personal computer, a server, and/or any other present or future electronic device and/or computer. The computer can include, for example, components such as a processor, an operating system, a system memory, a memory storage device, input-output controllers, input-output devices, and/or display devices. Display devices can be configured to display visual information that may be may be logically and/or physically organized as an array of pixels. A GUI controller may also be included that may include any of a variety of known or future software programs for providing graphical input and output interfaces such as for instance GUI's. For example, GUI's may provide one or more graphical representations to a user, and also be enabled to process the user inputs via GUI's using means of selection or input known to those of ordinary skill in the related art. For example, see U.S. Patent Application No. 61/048,657, which is incorporated by reference in its entirety.

A computer can have many possible configurations of components and some components that may typically be included in a computer are not shown, such as a cache a memory, a data backup unit, and/or many other devices. The processor can be a commercially available processor such as an Itanium® or Pentium® processor made by Intel Corporation, a SPARC® processor made by Sun Microsystems, an Athalon™ or Opteron™ processor made by AMD corporation, or it may be one of other processors that are or will become available. Some embodiments of the processor may also include what are referred to as Multi-core processors and/or be enabled to employ parallel processing technology in a single or multi-core configuration. For example, a multi-core architecture typically can include two or more processor such as "execution cores." In the present example, each execution core may perform as an independent processor that enables parallel execution of multiple threads. In addition, the processor may be configured in what is generally referred to as 32 or 64 bit architectures, or other architectural configurations now known or that may be developed in the future.

The processor executes operating system, which may be, for example, a Windows®-type operating system (such as Windows® XP) from the Microsoft Corporation; the Mac OS X operating system from Apple Computer Corp. (such as 7.5 Mac OS X v10.4 "Tiger" or 7.6 Mac OS X v10.5 "Leopard" operating systems); a Unix® or Linux-type operating system available from many vendors or what is referred to as an open source; another or a future operating system; or some combination thereof. In some embodiments, the operating system can be configured to interface with firmware and hardware in various manners, and facilitate a processor in coordinating and executing the functions of various computer programs that may be written in a variety of programming languages. The operating system can be configured to cooperate with the processor, coordinate and execute functions of the other components of computer. The operating system can also be configured to provide scheduling, input/output control, file and data management, memory management, and/or communication control and related services.

In some embodiments, a memory can be used in conjunction with the embodiments described herein. The memory may be any of a variety of known or future memory storage devices. Examples include any available random access memory (RAM), magnetic medium such as a resident hard disk or tape, an optical medium such as a read and write compact disc, or other memory storage device. Memory storage devices may be any of a variety of known or future devices, including a compact disk drive, a tape drive, a removable hard disk drive, USB or flash drive, or a diskette drive. Such types of memory storage devices can be configured to read from, and/or write to, a program storage medium (not shown) such as, respectively, a compact disk, magnetic tape, removable hard disk, USB or flash drive, or floppy diskette. Any of these program storage media, or others now in use or that may later be developed, may be considered a computer program product. As will be appreciated, these program storage media typically store a computer software program and/or data. Computer software programs, also called computer control logic, can be stored in system memory and/or the program storage device used in conjunction with memory storage device.

What is claimed is:

1. One or more non-transitory processor readable-media storing code representing instructions that when executed by one or more processors cause the one or more processors to:
    maintain a database having at least one user-provided cell population definition and at least one associated definition of a well;
    define logic to describe the at least one user-provided cell population;
    receive data associated with at least one experiment;
    generate a plurality of boundaries to a plurality of separate regions to define gating data associated with the data associated with the at least one experiment;
    identify outlying data points from the data associated with the at least one experiment for manual review using statistical analysis on the gating data;
    highlight and tag a boundary from the plurality of boundaries that is likely to be incorrect based on the gating data;
    adjust the boundary from the plurality of boundaries;
    provide, to a user, data associated with the at least one experiment and the boundary such that the user can visualize the effect on the data associated with the at least one experiment and the boundary before and after adjusting the boundary; and
    store a user preference associated with the adjusting the boundary.

2. The one or more non-transitory processor-readable media of claim 1, wherein the code to cause the one or more processors to adjust includes code to cause the one or more processors to adjust the boundary based on a gating sensitivity algorithm, biological knowledge, the user preference, or a signal from a user associated with adjusting the boundary.

3. The one or more non-transitory processor-readable media of claim 1, wherein the code to cause the processor to receive includes code to cause the processor to receive data from at least one of a flow cytometry experiment or a mass spectrometry experiment.

4. The one or more non-transitory processor-readable media of claim 1, wherein the code further comprises code to cause the one or more processors to:
    derive a population hierarchy based on the at least one user-provided cell population.

5. The one or more non-transitory processor-readable media of claim 1, wherein the code to cause the processor to generate includes code to cause the processor to generate the plurality of boundaries using intracellular markers, surface markers, scatter patterns, or expression markers.

6. One or more non-transitory processor-readable media storing code representing instructions that when executed by one or more processors cause the one or more processors to:
    receive a set of parameter values defining a boundary within a data space associated with a dataset, the dataset representing signaling related to a test substance;
    define a first metric based on a first portion of the dataset associated with a first region defined by the boundary;
    modify the boundary; and
    define a second metric based on a second portion of the dataset associated with a second region defined by the boundary after the boundary is modified, the second region being different than the first region.

7. The one or more non-transitory processor-readable media of claim 6, wherein the boundary is modified based on a random number.

8. The one or more non-transitory processor-readable media of claim 6, wherein the boundary includes a vertex, the modifying of the boundary includes modifying the vertex of the boundary.

9. The one or more non-transitory processor-readable media of claim 6, wherein the modifying of the boundary includes scaling the boundary along an axis.

10. The one or more non-transitory processor-readable media of claim 6, further storing code representing instructions that when executed by the one or more processors cause the one or more processors to:
    define an axis of the boundary based on an Eigenvector, the boundary being modified along the axis based on a random number.

11. The one or more non-transitory processor-readable media of claim 6, further storing code representing instructions that when executed by the one or more processors cause the one or more processors to:
    define an axis based on an orientation of the dataset within the data space, the modifying of the boundary is based on the axis.

12. The one or more non-transitory processor-readable media of claim 6, wherein the boundary includes a vertex,
    the one or more processor-readable media further storing code representing instructions that when executed by the one or more processors cause the one or more processors to:

define an axis based on a shape mathematically fitted to the boundary, the modifying of the boundary includes modifying the vertex of the boundary based on the axis.

13. The one or more non-transitory processor-readable media of claim 6, wherein the modifying of the boundary is performed based on a user preference.

14. The one or more non-transitory processor-readable media of claim 6, wherein the first portion of the dataset includes a plurality of datapoints outside of the data space.

15. The one or more non-transitory processor-readable media of claim 6, wherein the boundary is a first boundary, the dataset is defined based on a second boundary within the data space, the first boundary being logically related to the second boundary.

16. The one or more non-transitory processor-readable media of claim 6, wherein the boundary is a first boundary, the first region is based on a combination of the first boundary and a second boundary, the one or more non-transitory processor-readable media further storing code representing instructions that when executed by the one or more processors cause the one or more processors to:
modify the second boundary, the second region is based on a combination of the second boundary after the second boundary is modified and the first boundary after the first boundary is modified.

17. One or more non-transitory processor-readable media storing code representing instructions that when executed by one or more processors cause the one or more processors to:
receive a set of parameter values defining a first boundary within a data space associated with a dataset, the first boundary defining a region inside the first boundary, the dataset representing signaling related to a test substance;
receive a set of parameter values defining a second boundary circumscribing the first boundary, the second boundary being within the data space; and
define a plurality of metrics based on a portion of the dataset included in the region and based on a plurality of relationships between a plurality of perturbations of the second boundary and a portion of the dataset outside of the region.

18. The one or more non-transitory processor-readable media of claim 17, further storing code representing instructions that when executed by the one or more processors cause the one or more processors to:
receive a set of parameter values defining a third boundary circumscribing the second boundary, each perturbation from the plurality of perturbations of the second boundary being within a region between the first boundary and the third boundary.

19. The one or more non-transitory processor-readable media of claim 17, wherein the region is a first region,
further storing code representing instructions that when executed by the one or more processors cause the one or more processors to:
receive a set of parameter values defining a third boundary circumscribing the second boundary, the portion of the dataset outside of the first region is within a second region between the second boundary and the third boundary.

20. The one or more non-transitory processor-readable media of claim 17, wherein the region is a first region,
further storing code representing instructions that when executed by the one or more processors cause the one or more processors to:
receive a set of parameter values defining a third boundary circumscribing the second boundary, each perturbation from the plurality of perturbations is defined by a vertex located within a second region between the second boundary and the third boundary.

* * * * *